United States Patent
Ishikawa et al.

(10) Patent No.: US 10,572,977 B2
(45) Date of Patent: Feb. 25, 2020

(54) IMAGE PROCESSING APPARATUS, IMAGE PROCESSING METHOD, AND NON-TRANSITORY COMPUTER-READABLE STORAGE MEDIUM THAT PERFORM STOCHASTIC RESONANCE PROCESSING ON PIXEL SIGNALS

(71) Applicant: CANON KABUSHIKI KAISHA, Tokyo (JP)

(72) Inventors: Tomokazu Ishikawa, Yokohama (JP); Wakako Tanaka, Inagi (JP); Tetsuya Suwa, Yokohama (JP); Shinjiro Hori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 155 days.

(21) Appl. No.: 15/470,024

(22) Filed: Mar. 27, 2017

(65) Prior Publication Data
US 2017/0287115 A1 Oct. 5, 2017

(30) Foreign Application Priority Data
Mar. 31, 2016 (JP) .................. 2016-071182

(51) Int. Cl.
*G06T 5/00* (2006.01)
*G06K 9/03* (2006.01)
(Continued)

(52) U.S. Cl.
CPC ............. *G06T 5/002* (2013.01); *B41J 2/2139* (2013.01); *G06K 9/036* (2013.01); *G06T 5/003* (2013.01);
(Continued)

(58) Field of Classification Search
CPC ...... B41J 2/2139; B41J 2/2132; B41J 2/2142; G06K 9/036; G06T 5/002; G06T 5/003;
(Continued)

(56) References Cited

U.S. PATENT DOCUMENTS 5,867,219 A * 2/1999 Kohiyama ........... H04N 19/176
348/400.1
6,031,560 A * 2/2000 Wojcik ............... G06K 15/1204
347/131
(Continued)

FOREIGN PATENT DOCUMENTS

JP 61221973 A * 10/1986
JP 2011-052991 A 3/2011
JP 2013-135244 A 7/2013

OTHER PUBLICATIONS

Copending, unpublished U.S. Appl. No. 15/470,023, filed Mar. 27, 2017, to Tetsuya Suwa, et al.
(Continued)

*Primary Examiner* — Mekonen T Bekele
(74) *Attorney, Agent, or Firm* — Venable LLP

(57) ABSTRACT

An image processing apparatus a processor that acquires reading image data, composed of a plurality of pixel signals, and executes stochastic resonance processing, in which each of the plurality of pixel signals is added to noise and is subjected to a binary processing, and a plurality of results, obtained by performing the noise addition and the binary processing on the plurality of pixel signals in parallel, are synthesized. With regard to a pixel signal as a processing target among the plurality of pixel signals, at least one of a strength of the noise and a threshold value used for the binary processing is set based on a pixel signal of the input image data corresponding to the pixel signal. In addition, the processor outputs the result of the stochastic resonance processing.

29 Claims, 16 Drawing Sheets

(51) Int. Cl.
*H04N 5/357* (2011.01)
*G06T 5/50* (2006.01)
*H04N 5/232* (2006.01)
*H04N 1/40* (2006.01)
*B41J 2/21* (2006.01)
*H04N 1/60* (2006.01)
*H04N 1/58* (2006.01)

(52) U.S. Cl.
CPC .............. *G06T 5/006* (2013.01); *G06T 5/007* (2013.01); *G06T 5/008* (2013.01); *G06T 5/50* (2013.01); *H04N 1/40* (2013.01); *H04N 1/58* (2013.01); *H04N 1/6041* (2013.01); *H04N 5/23232* (2013.01); *H04N 5/357* (2013.01); *B41J 2/2132* (2013.01); *B41J 2/2142* (2013.01); *G06T 2207/20076* (2013.01); *G06T 2207/30144* (2013.01)

(58) Field of Classification Search
CPC ......... G06T 5/006; G06T 5/007; G06T 5/008; G06T 5/50; G06T 2207/20076; G06T 2207/30144; H04N 1/40; H04N 1/58; H04N 1/6041; H04N 5/23232; H04N 5/357
See application file for complete search history.

(56) References Cited

U.S. PATENT DOCUMENTS

| | | | |
|---|---|---|---|
| 8,433,199 B2* | 4/2013 | Fleischer | G01R 33/0029 398/140 |
| 8,774,480 B2* | 7/2014 | Roy | G06T 5/008 382/131 |
| 9,026,404 B2* | 5/2015 | Peng | A61B 6/502 702/179 |
| 9,287,962 B2 | 3/2016 | Kasai et al. | |
| 10,068,318 B2* | 9/2018 | Dzyubak | G06T 5/002 |
| 10,089,732 B2* | 10/2018 | Ishikawa | G06T 7/0002 |
| 10,430,684 B2* | 10/2019 | Tanaka | G06K 9/46 |
| 2015/0254506 A1* | 9/2015 | Fukasawa | A61B 6/5294 382/112 |
| 2016/0203589 A1* | 7/2016 | Dzyubak | G06T 5/002 382/131 |
| 2016/0211110 A1* | 7/2016 | Kanai | H01J 37/22 |
| 2017/0287125 A1* | 10/2017 | Tanaka | G06K 9/00986 |
| 2018/0096218 A1* | 4/2018 | Tanaka | G06K 9/0051 |

OTHER PUBLICATIONS

J.J. Collins, et al., "Stochastic resonance without tuning," Nature (UK), vol. 376, Jul. 20, 1995, pp. 236-238.

* cited by examiner

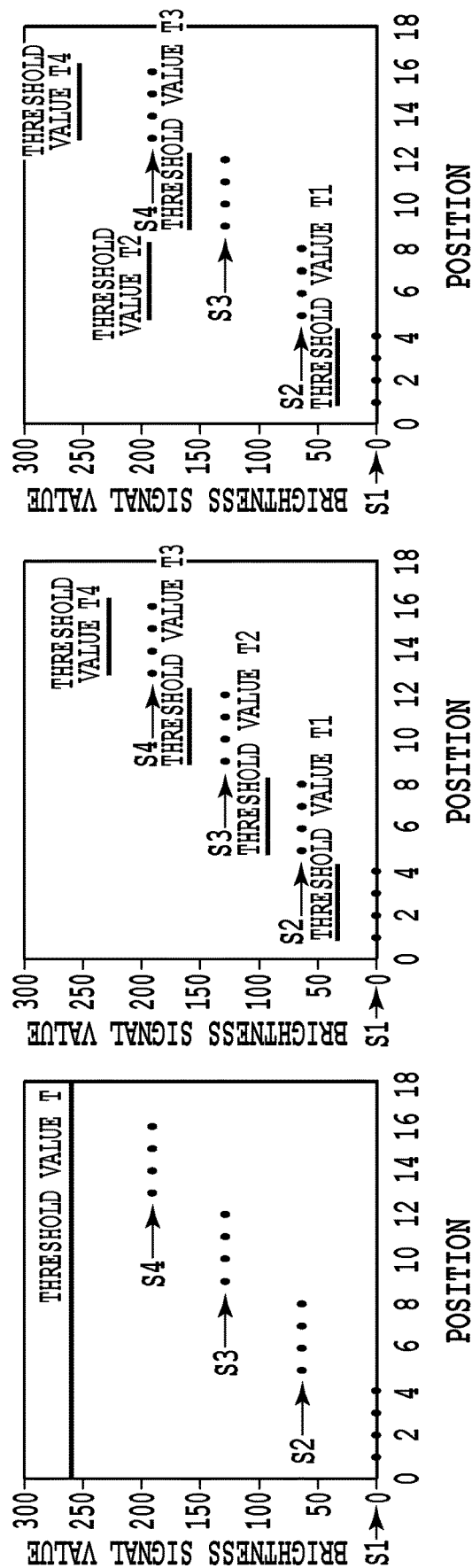

IMAGE PROCESSING APPARATUS, IMAGE PROCESSING METHOD, AND NON-TRANSITORY COMPUTER-READABLE STORAGE MEDIUM THAT PERFORM STOCHASTIC RESONANCE PROCESSING ON PIXEL SIGNALS

This application claims the benefit of Japanese Patent Application No. 2016-071182, filed on Mar. 31, 2016, which is hereby incorporated by reference herein in its entirety.

BACKGROUND OF THE INVENTION

Field of the Invention

The present invention relates to an image processing apparatus and an image processing method that detect a singular portion included in a detection target image.

Description of the Related Art

In order to extract a detection target signal from an input signal buried in noise, a stochastic resonance process is useful. The stochastic resonance process is a phenomenon in which an input signal buried in noise is further added with noise and the resultant signal is subsequently subjected to nonlinear processing to thereby emphasize a detection target signal. In such a stochastic resonance process, however, a correlation coefficient, used as an evaluation value showing the performance of the detection result, changes depending on the strength of the added noise, as shown in FIG. 1. In the case of FIG. 1, the correlation coefficient is maximum when the added noise strength is 30. That is, the noise strength is desirably tuned because of the existence of the noise strength optimal for the realization of the maximum detection accuracy.

In a paper by J. J. Collins, Carson C. Chow, and Thomas T. Imhoff, entitled "Stochastic resonance without tuning", published in NATURE, (UK), 20 Jul. 1995, vol. 376, pp. 236 to 238 (Collins et al. publication) discloses a configuration, as shown in FIG. 2, in which an input signal I(x) is branched to a plurality of pieces, different noises are added to the respective pieces, and the resultant pieces are subjected to nonlinear processing to further synthesize the outputs thereof, and to thereby detect a detection target signal at a stable accuracy. The Collins et al. publication describes that the increase of the branches allows the correlation coefficient to be stabilized regardless of the strength, which eliminates the peak as shown in FIG. 1, thus resulting in the elimination of the need to tune the noise strength. Japanese Patent Laid-Open No. 2013-135244 discloses a configuration in which independent noise generation sources, as in the Collins et al. publication, are not prepared, and noise generated by one noise generation source is added by being mutually delayed by a plurality of signal lines, thereby providing the same effect as that of the Collins et al. publication.

Japanese Patent Laid-Open No. 2011-52991 discloses a method to set a nonlinear function as a logistic function, a sigmoid function, or a hyperbolic tangent function to thereby increase the correlation coefficient within a wide noise strength range. In the case of Japanese Patent Laid-Open No. 2011-52991, as described above, there is no need to prepare a plurality of nonlinear circuits as in the Collins et al. publication and Japanese Patent Laid-Open No. 2013-135244. Thus, an effect similar to those of the above publications can be realized by a simpler circuit.

In recent years, the extraction of a detection target signal using the stochastic resonance process, as described above, also may be used for product inspection, or the like. For example, an inspection target can be imaged, the resultant image data is added with predetermined noise, and the resultant data is subjected to nonlinear processing, thereby extracting a singular portion, such as a flaw, existing in the image. Furthermore, the singular portion extraction mechanism, as described above, is not limited to the inspection step in a production site, and also can be used for a product itself. Specific examples include a configuration in which a personal printer images an image, printed by itself, to compare image data used for the printing with the image data obtained by reading the printed image to automatically extract a singular portion, such as ejection failure.

When an actual image is printed and a singular portion existing in the image is extracted, however, securing the extraction accuracy of the singular portion has been difficult even by the use of the method described in the above patent publication. In the case of an image including the combination of various lightness and hues, such as a photograph image in particular, how easily a singular portion can be extracted differs depending on the lightness or hue of the pixel, which has caused a case in which the extraction frequency of the singular portion may be uneven depending on the image position. Specifically, there has been a case in which a wrong point is unintendedly extracted in the same image even when the point is actually not a singular portion, or an actually-singular portion cannot be extracted.

SUMMARY OF THE INVENTION

The present invention has been made in order to solve the above disadvantage. Thus, it is an objective of the invention to provide an image processing apparatus and an image processing method by which a singular portion can be extracted at a stable accuracy from an image including therein various lightness and hues.

According to one aspect, the present invention provides an image processing apparatus comprising a unit configured to acquire reading image data composed of a plurality of pixel signals by imaging an image that is printed by a printing unit based on input image data composed of a plurality of pixel signals, a stochastic resonance processing unit configured to execute a stochastic resonance processing in which each of the plurality of pixel signals constituting the reading image data is added noise and subjected to a binary processing and a plurality of results obtained by parallelly performing above step are synthesized, and an output unit configured to output the result of the stochastic resonance processing, wherein the stochastic resonance processing unit sets, with regard to a pixel signal as a processing target among the plurality of pixel signals, at least one of a strength of the noise and a threshold value used for the binary processing based on a pixel signal of the input image data corresponding to the pixel signal.

According to another aspect, the present invention provides an image processing apparatus comprising a unit configured to acquire reading image data composed of a plurality of pixel signals by imaging an image printed by a printing unit based on input image data composed of a plurality of pixel signals, a stochastic resonance processing unit configured to execute a stochastic resonance processing to obtain a result corresponding to a result that is calculated in a case in which each of the plurality of pixel signals constituting the reading image data is added noise and subjected to a binary processing and a plurality of results obtained by parallelly performing above step are synthesized and the parallel number is infinite, and an output unit configured to output the result of the stochastic resonance processing, wherein the stochastic resonance processing unit sets, with regard to a pixel signal as a processing target among the plurality of pixel signals, at least one of a strength of the noise and a threshold value used for the binary processing based on a pixel signal of the input image data corresponding to the pixel signal.

According to still another aspect, the present invention provides an image processing method comprising a step of acquire reading image data composed of a plurality of pixel signals by imaging an image printed based on input image data composed of a plurality of pixel signals, a stochastic resonance processing step of executing a stochastic resonance processing in which each of the plurality of pixel signals constituting the reading image data is added noise and subjected to a binary processing and a plurality of results obtained by parallelly performing above step are synthesized, and an output step of outputting the result of the stochastic resonance processing, wherein the stochastic resonance processing step sets, with regard to a pixel signal as a processing target among the plurality of pixel signals, at least one of the noise and a threshold value used for the binary processing based on a pixel signal of the input image data corresponding to the pixel signal.

According to yet another aspect, the present invention provides an image processing method comprising a step of acquiring reading image data composed of a plurality of pixel signals by imaging an image printed based on input image data composed of a plurality of pixel signals, a stochastic resonance processing step of executing a stochastic resonance processing to obtain a result corresponding to a result that is calculated in a case in which each of the plurality of pixel signals constituting the reading image data is added noise and subjected to a binary processing and a plurality of results obtained by parallelly performing above step are synthesized and the parallel number is infinite, and an output step of outputting the result of the stochastic resonance processing, wherein the stochastic resonance processing step sets, with regard to a pixel signal as a processing target among the plurality of pixel signals, at least one of a strength of the noise and a threshold value used for the binary processing based on a pixel signal of the input image data corresponding to the pixel signal.

According to still another aspect, the present invention provides a non-transitory computer-readable storage medium that stores a program for allowing a computer to execute a image processing method, the image processing method comprising a step of acquiring reading image data composed of a plurality of pixel signals by imaging an image printed based on input image data composed of a plurality of pixel signals, a stochastic resonance processing step of executing a stochastic resonance processing to obtain a result corresponding to a result that is calculated in a case in which each of the plurality of pixel signals constituting the reading image data is added noise and subjected to a binary processing and a plurality of results obtained by parallelly performing above step are synthesized and the parallel number is infinite, and an output step of outputting the result of the stochastic resonance processing, wherein the stochastic resonance processing step sets, with regard to a pixel signal as a processing target among the plurality of pixel signals, at least one of a strength of the noise and a threshold value used for the binary processing based on a pixel signal of the input image data corresponding to the pixel signal.

Further features of the present invention will become apparent from the following description of exemplary embodiments with reference to the attached drawings.

BRIEF DESCRIPTION OF THE DRAWINGS

FIGS. 9A to 9C are diagrams to explain a method of setting a threshold value and a brightness signal value strength.

DESCRIPTION OF THE EMBODIMENTS

FIGS. 3A to 3D illustrate an embodiment of an image processing apparatus 1 that can be used in the present invention. The image processing apparatus 1 of the present invention is used to subject imaged image data to a popup processing to allow a user to more easily recognize a white stripe in a printed image, for example, or a processing for the determination by the apparatus 1 itself. The image processing apparatus 1 of the present invention can take various system forms.

Figure 3A:
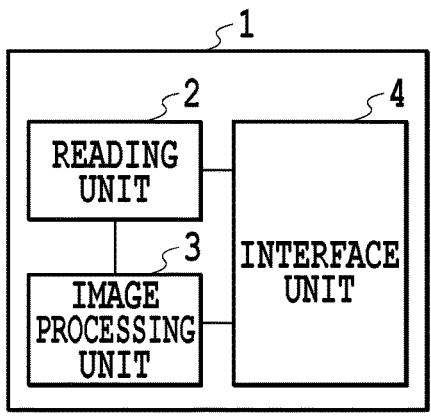
FIGS. 3A to 3D show an embodiment of an image processing apparatus that can be used in the present invention.

FIG. 3A illustrates an embodiment in which the image processing apparatus 1 includes a reading unit 2. For example, this embodiments corresponds to a case in which a sheet, on which a predetermined image is printed by an inkjet printing apparatus, is placed on a reading base of the reading unit 2 in the image processing apparatus 1, and is imaged by an optical sensor, for example, and the image data is processed by an image processing unit 3. The image processing unit 3 includes a central processing unit (CPU), or an image processing accelerator providing a processing having a higher speed than that of the CPU, that controls the reading operation by the reading unit 2 and subjects received image data to a predetermined inspection processing for example.

Figure 3B:
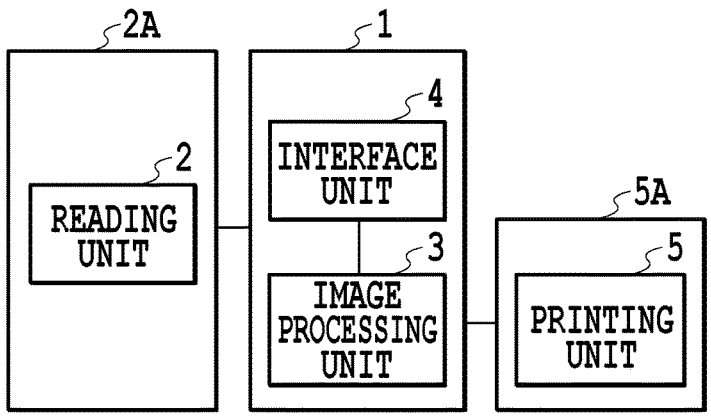

FIG. 3B illustrates an embodiment in which the image processing apparatus 1 is externally connected to a reading apparatus 2A including the reading unit 2. For example, this embodiment corresponds to a system in which a scanner is connected to a personal computer (PC) for example. A general connection method, such as universal serial bus (USB), Gigabit Ethernet (GigE), or CameraLink may be used. The image data read by the reading unit 2 is provided via an interface 4 to the image processing unit 3. The image processing unit 3 subjects the received image data to a predetermined inspection processing. In the case of this embodiment, the image processing apparatus 1 also may be further externally connected to a printing apparatus 5A including a printing unit 5.

Figure 3C:
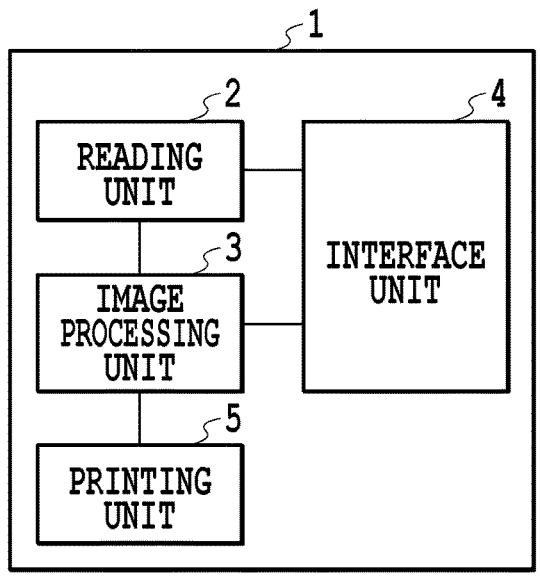

FIG. 3C illustrates an embodiment in which the image processing apparatus 1 includes the reading unit 2 and the printing unit 5. This embodiment corresponds to a complex machine including a scanner function, a printer function, and an image processing function, for example. The image processing unit 3 controls all operations, such as the printing operation in the printing unit 5, the reading operation in the reading unit 2, and the inspection processing to an image read by the reading unit 2.

Figure 3D:
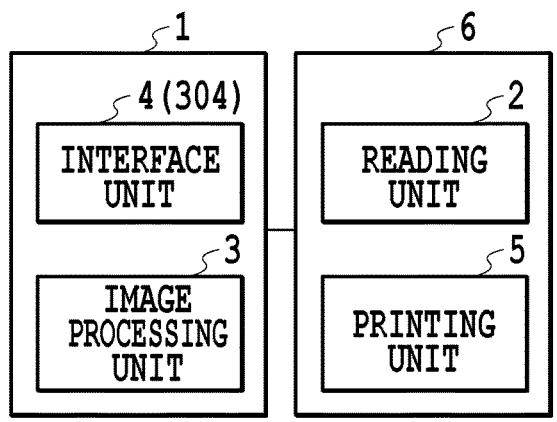

FIG. 3D illustrates an embodiment in which a complex machine 6, including the reading unit 2 and the printing unit 5, is externally connected to the image processing apparatus 1. This embodiment corresponds to a system in which a complex machine 6, including both of a scanner function and a printer function, is connected to a PC, for example. The image processing apparatus 1 of the present invention also can take any of the forms shown in FIGS. 3A to 3D. The following description, however, relates the image inspection apparatus using the embodiment of FIG. 3D.

First Embodiment

Figure 4:
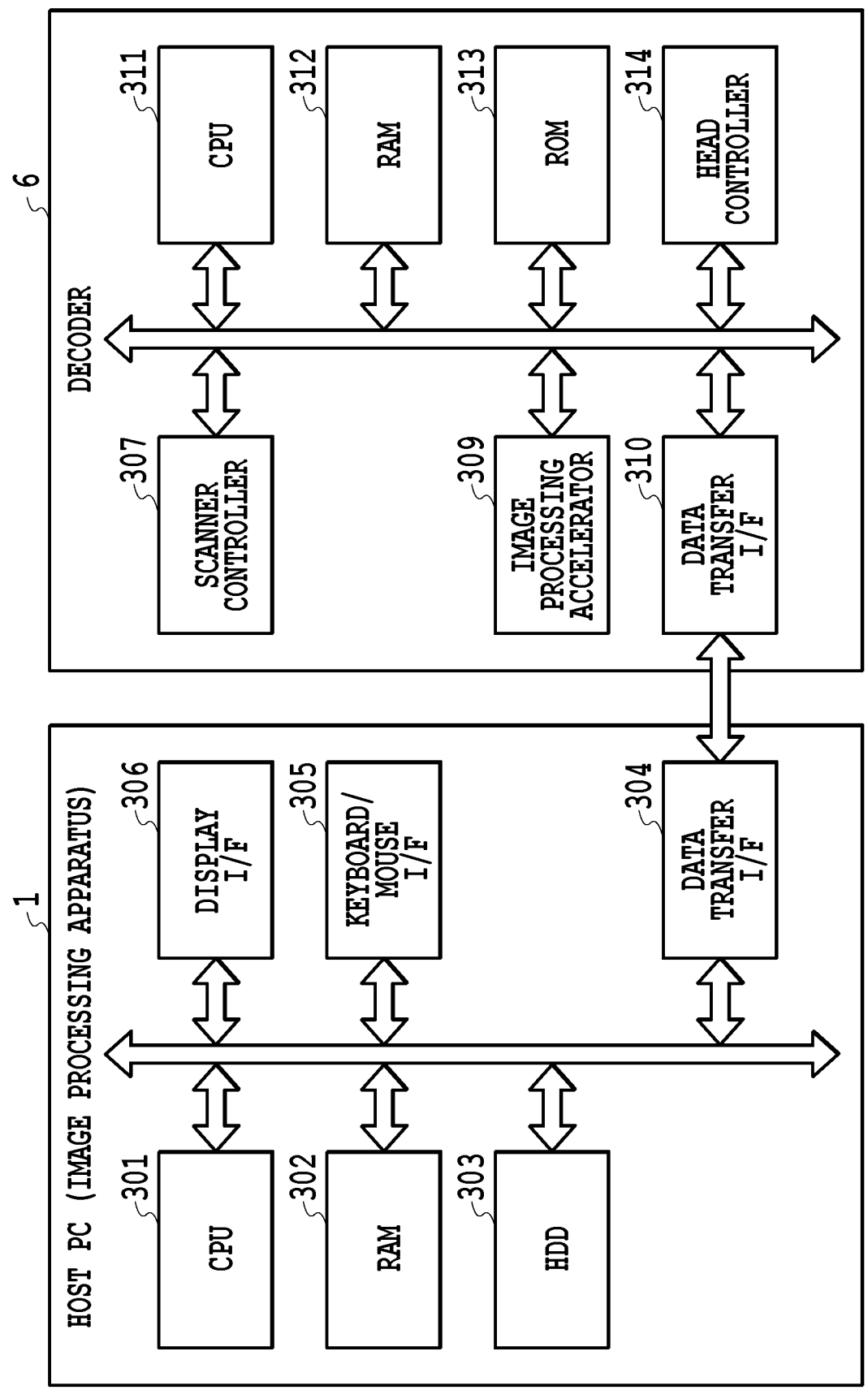
FIG. 4 is a block diagram to explain the configuration of the control in a first embodiment.

FIG. 4 is a block diagram for explaining the control configuration in the embodiment of FIG. 3D. The image processing apparatus 1, as a signal extraction processing apparatus, consists of a host PC, for example. A CPU 301 executes various kinds of processing while using a random access memory (RAM) 302 as a work area in accordance with a program retained in a hard disk drive (HDD) 303. For example, the CPU 301 generates image data that can be printed by the complex machine 6 based on a command received from a user via a keyboard/mouse interface (I/F) 305 or a program retained by the HDD 303, and transfers this to the complex machine 6. The CPU 301 subjects the image data received from the complex machine 6 via a data transfer I/F 304 to predetermined processing based on the program stored in the HDD to display the result or various pieces of information on a display (not shown) via a display I/F 306. Image data I(x), which is a target of the stochastic resonance processing of this embodiment, as described later, is received from the complex machine 6 via the data transfer I/F 304.

On the other hand, in the complex machine 6, a CPU 311 executes various kinds of processing while using a RAM 312 as a work area based on a program retained by a read only memory (ROM) 313. The complex machine 6 includes an image processing accelerator 309 for performing high-speed image processing, a scanner controller 307 for controlling the reading unit 2, and a head controller 314 for controlling the printing unit 5.

The image processing accelerator 309 is hardware that can execute image processing at a higher speed than the CPU 311. The image processing accelerator 309 is activated by allowing the CPU 311 to write parameters required for the image processing and data to a predetermined address of the RAM 312. After the above parameters and data are read, the data is subjected to a predetermined image processing. The image processing accelerator 309 is not, however, an indispensable element. Thus, similar processing can be executed by the CPU 311.

The head controller 314 supplies printing data to a printing head 100 provided in the printing unit 5 and controls the printing operation of the printing head 100. The head controller 314 is activated by allowing the CPU 311 to write printing data that can be printed by the printing head 100 and control parameters to a predetermined address of the RAM 312, and executes ejecting operation based on the printing data.

The scanner controller 307 outputs, while controlling the individual reading elements arranged in the reading unit 2, red, green, and blue (RGB) brightness data obtained therefrom to the CPU 311. The CPU 311 transfers the resultant RGB brightness data via the data transfer I/F 310 to the image processing apparatus 1. The data transfer I/F 304 of the image processing apparatus 1 and the data transfer I/F 310 of the complex machine 6 can be connected by a USB, Institute of Electrical and Electronics Engineers standard 1394 (IEEE1394), or a local area network (LAN), for example.

Figure 5:
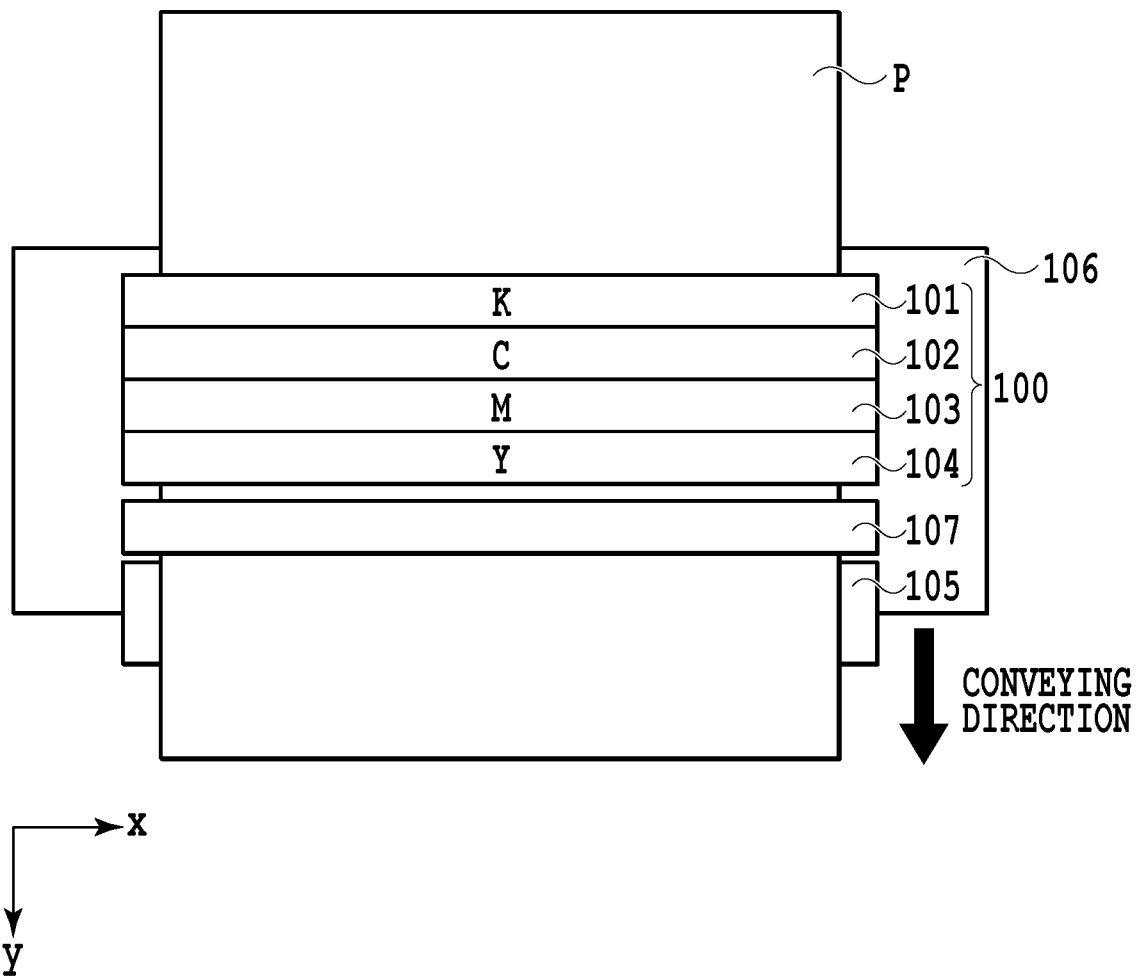
FIG. 5 is a schematic view illustrating the configuration of a full line-type inkjet printing apparatus.

FIG. 5 is a schematic view illustrating the configuration of an inkjet printing apparatus that can be used as the complex machine 6 of this embodiment (hereafter also simply referred to as a printing apparatus). The printing apparatus of this embodiment is a full line-type printing apparatus, in which the printing head 100, having a width similar to that of the sheet P that may be a printing medium or an inspection target, and the reading head 107 are parallelly arranged in a Y direction. The printing head 100 includes four printing element columns 101 to 104 through which inks of black (K), cyan (c), magenta (M), and yellow (Y) are ejected, respectively. These printing element columns 101 to 104 are parallelly arranged in a conveying direction of the sheet P (Y direction). At a further downstream of the printing element columns 101 to 104, the reading head 107 is provided. The reading head 107 includes therein a plurality of reading elements for reading a printed image arranged in the X direction.

In order to perform printing processing or reading processing, the sheet P is conveyed at a predetermined speed in accordance with the rotation of a conveying roller 105 in the Y direction of the drawing. During this conveyance, the printing processing by the printing head 100 or the reading processing by the reading head 107 is performed. The sheet P, at a position at which the printing processing by the printing head 100 or the reading processing by the reading head 107 is performed, is supported from the lower side by a platen 106 consisting of a flat plate to thereby maintain the distance from the printing head 100 or the reading head 107 and the smoothness.

Figure 6A:
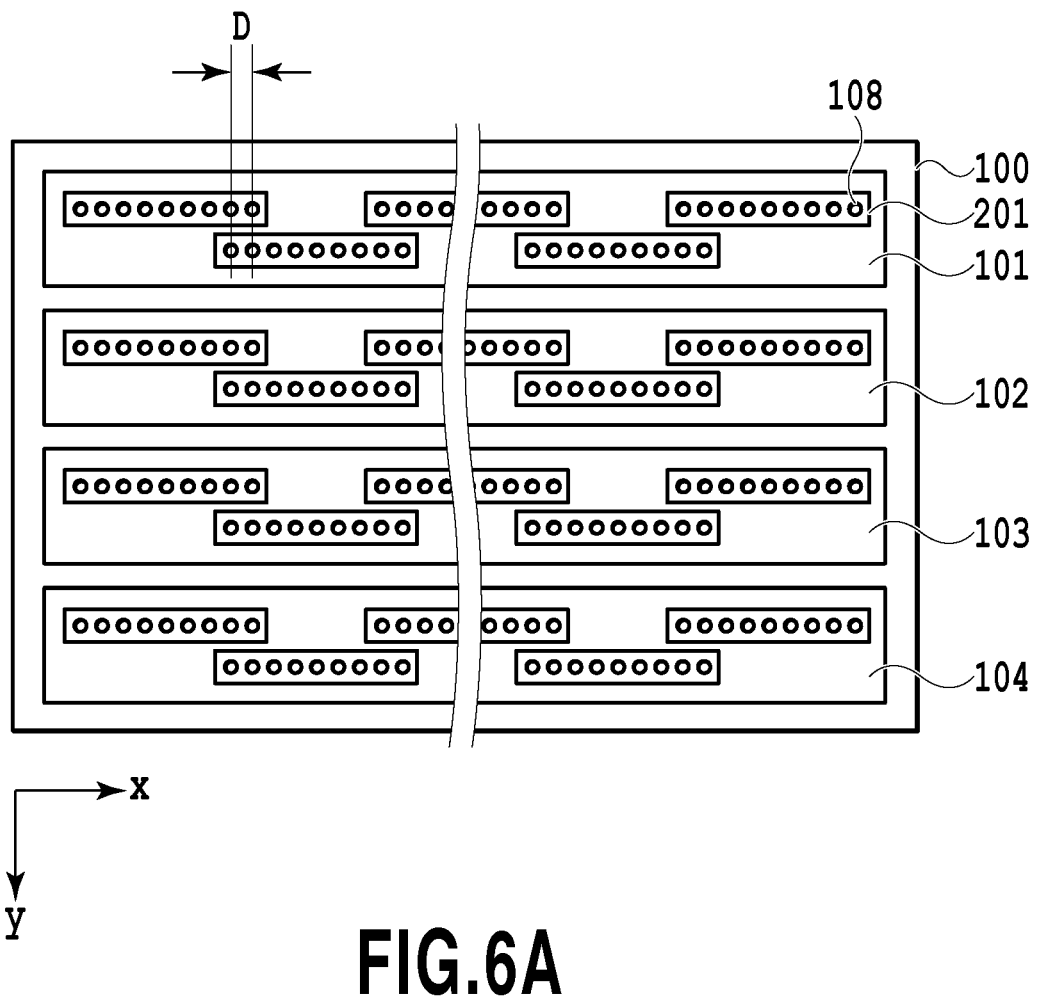
FIGS. 6A and 6B illustrate the arrangement configuration of printing elements of a printing head and reading elements of a reading head.
Figure 6B:
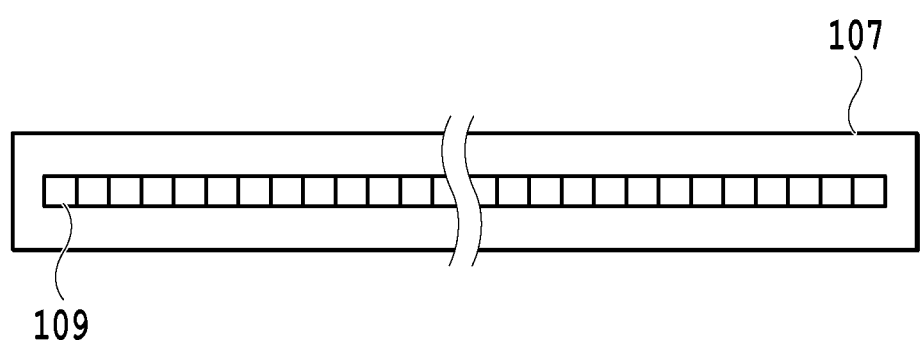

FIGS. 6A and 6B illustrate the arrangement configuration of printing elements in the printing head 100 and the arrangement configuration of reading elements in the reading head 107. In the printing head 100, the printing element columns 101 to 104 corresponding to the respective ink colors are configured so that a plurality of printing element substrates 201, in which a plurality of printing elements 108 are arranged at a fixed pitch, are alternately arranged in the Y direction so as to be continuous in the X direction while having the overlap region D. To the sheet P, conveyed at a fixed speed in the Y direction, ink is ejected through the individual printing elements 108 based on the printing data at a fixed frequency, thereby printing an image having the resolution corresponding to the arrangement pitch of the printing element 108 onto the sheet P. If some defect, such as ejection failure or a shifting of ejection direction, occurs on a specific printing element 108, a white stripe or a black stripe extending in the Y direction appears on the sheet P.

Figure 7B:
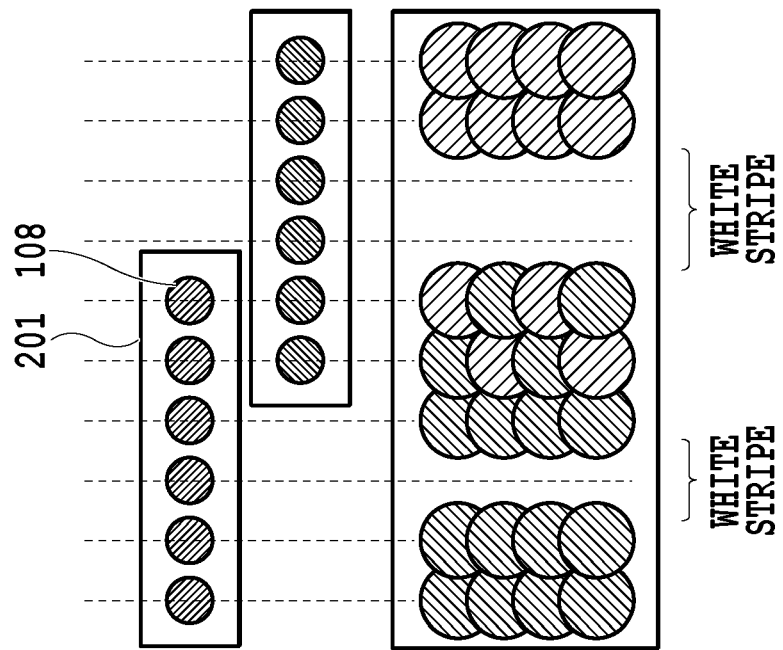
FIGS. 7A and 7B are diagrams to explain a white stripe that occurs due to defective ejection.
Figure 7A:
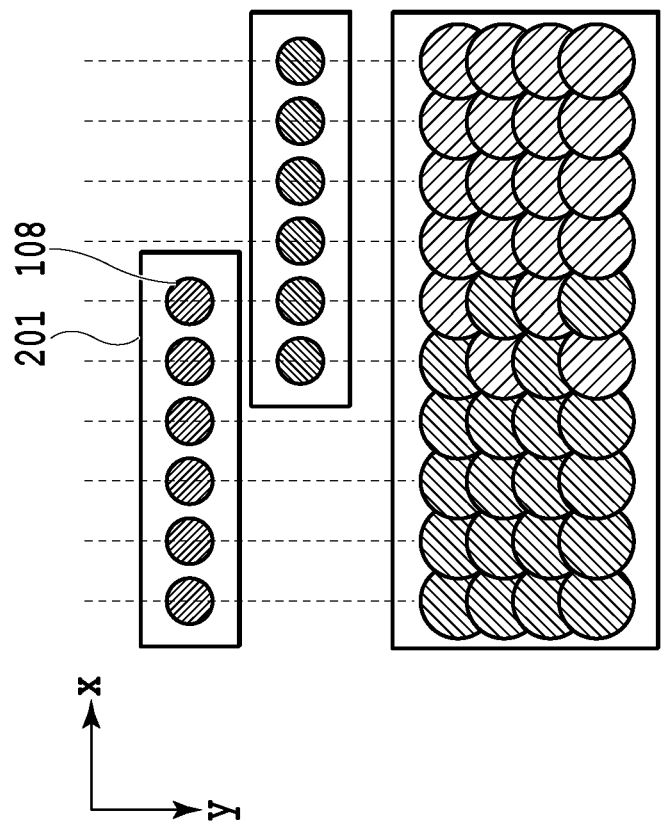

FIGS. 7A and 7B are diagrams to explain a white stripe caused by a defective ejection of a printing element that should be extracted as a singular portion, in particular, in this embodiment. FIGS. 7A and 7B illustrate the layout showing how printing elements 108 are arranged in one of the printing element columns 101 to 104 shown in FIG. 6A and the layout of dots printed on the sheet P by the individual printing elements 108. FIG. 7A illustrates a status in which no printing element 108 has a defective ejection, while FIG. 7B illustrates a status in which some printing elements 108 have a defective ejection. In a case in which some printing elements 108 have defective ejection, as shown in FIG. 7B, in the regions to be printed by the printing elements 108, no dot is placed, causing white stripes extending in the Y direction to appear on the sheet P. This embodiment intends to securely extract such white stripes as singular portions.

On the other hand, the reading head 107 includes a plurality of reading sensors 109 arranged at a predetermined pitch in the X direction. Although not shown, the individual reading sensors 109 are arranged so that a plurality of reading elements that may be the minimum unit of a reading pixel are arranged in the X direction. The reading element of this embodiment outputs a multivalued brightness signal of red (R), green (G), and blue (B) as reading data. The image on the sheet P, which is conveyed at a fixed speed in the Y direction, can be imaged by the reading elements of the individual reading sensor 109 at a predetermined frequency to thereby read the entire image printed on the sheet P at an arrangement pitch of the reading elements.

Figure 8A:
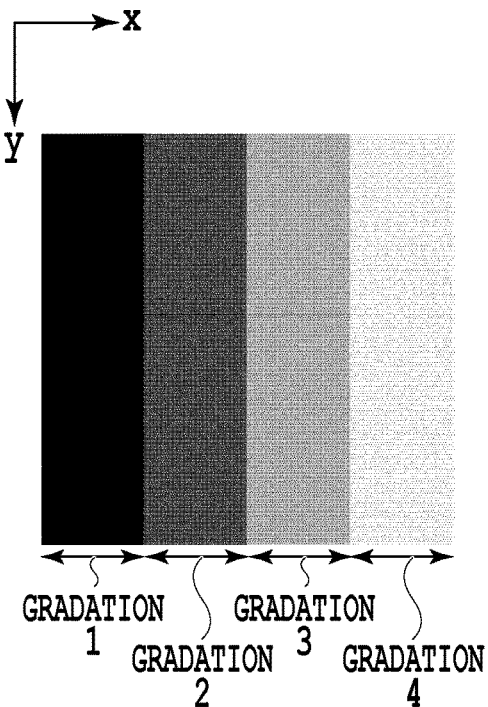
FIGS. 8A to 8D illustrate input image data and reading image data.

FIGS. 8A to 8D illustrate image data printed by a printing element column and image data read by the reading head 107. FIG. 8A illustrates an example of image data printed by a printing element column. The respective gradation 1 to gradation 4 have lightness (densities) different from each other. In the drawings, the X direction corresponds to the direction along which printing elements are arranged, while the Y direction corresponds to the direction along which the sheet P is conveyed.

Figure 8B:
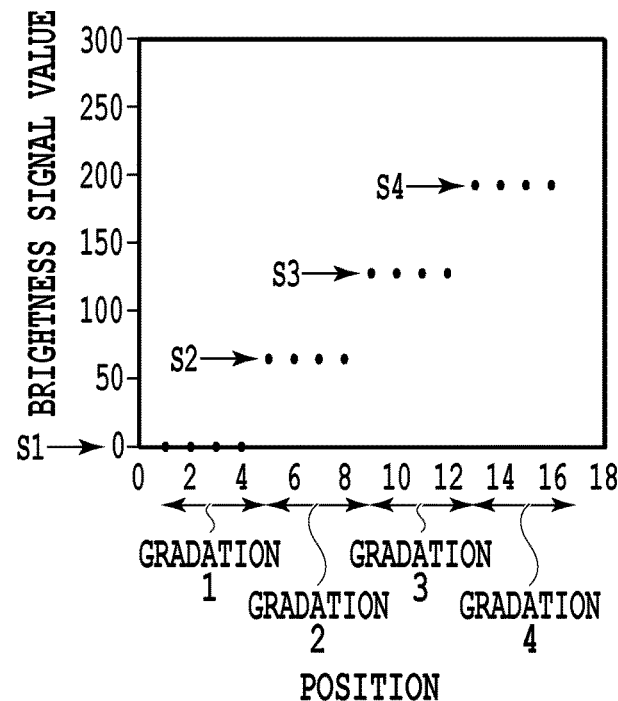

FIG. 8B illustrates the distribution of brightness signals in such image data. The term brightness signal has a value obtained by substituting RGB signal values provided by image data in a formula 4 described later. The horizontal axis shows the direction along which printing elements are arranged, while the vertical axis shows brightness signal values S corresponding to the respective printing elements. Assuming that the brightness signal value at the gradation 1 is S1, the brightness signal value at the gradation 2 is S2, the brightness signal value at the gradation 3 is S3, and the brightness signal value at the gradation 4 is S4, then a relationship of S1<S2<S3<S4 is established.

Figure 8C:
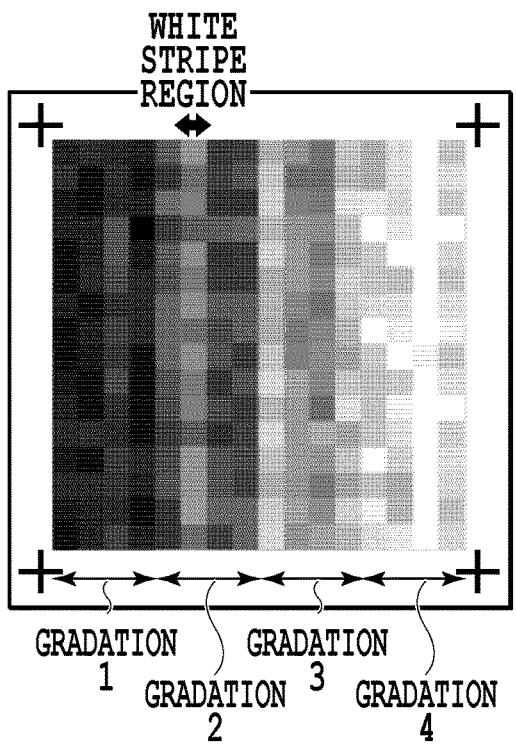

On the other hand, FIG. 8C illustrates an example of image data obtained by reading, by the reading head 107, an actual image printed by the printing head 100 based on the image data shown in FIG. 8A. A case is shown in which an ejection failure occurs at a printing element of a region corresponding to the gradation 2 and a white stripe extending in the Y direction exists.

Figure 8D:
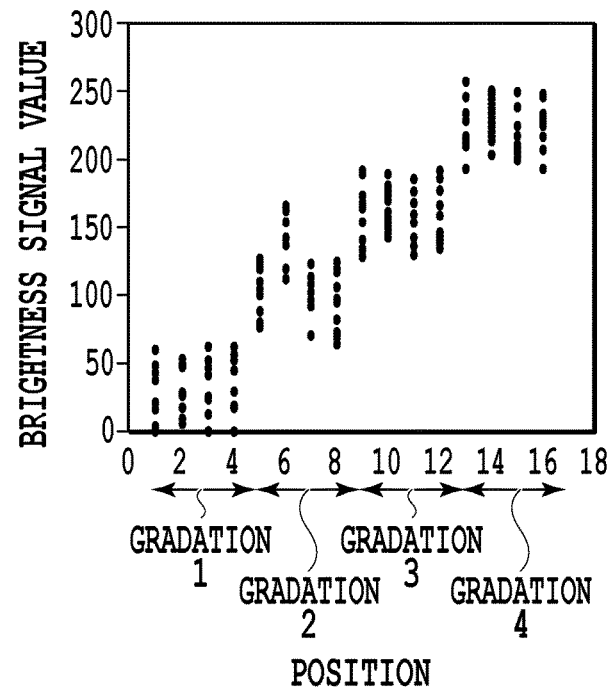

FIG. 8D illustrates brightness signal values of the reading image data shown in FIG. 8C. The brightness signal values are also obtained by substituting RGB signal values provided by reading image data in formula 4, described later. Since various noises are added during a printing operation and a reading operation, reading data have different brightness signal values for the respective pixels even at the same gradation. Thus, the signal value distribution shown in FIG. 8D has a difference in gradation that is less clear than the case of the signal value distribution (S1, S2, S3, and S4) shown in FIG. 8B and also has that is less clear white stripe positions. It can be seen that the brightness signal values have fluctuation ranges dislocated among gradations, however, and that the white stripe positions have fluctuation ranges relatively higher than the fluctuation ranges of other positions. This embodiment has an objective of comparing the image data as shown in FIG. 8A with the reading data as shown in FIG. 8C to securely extract a singular portion, such as a white stripe.

By the way, when attention is paid on FIGS. 8C and 8D, the white stripe region has brightness signals that are higher than brightness signals at surrounding gradations 2, but that are not higher than the brightness signals of the entire gradation 4. Specifically, if a threshold value to extract a white stripe in the gradation 2 is equal to a threshold value to extract a white stripe in the gradation 4, then a larger-than-required-number of singular portions are unintendedly extracted from regions included in the gradation 3 or the gradation 4. Although not clearly shown in the drawings, strength of noise added during a printing operation and a reading operation also may be different depending on a gradation. Thus, it is assumed that an appropriate strength value of noise added in the stochastic resonance processing also may be different depending on the gradation. In view of the above, through keen researches, the present inventors have reached a finding that it is useful to adjust a threshold value to use and a strength of the noise added to execute the stochastic resonance processing depending on original image data for each pixel.

The following section will specifically describe a singular portion detection algorithm in this embodiment. The singular portion detection algorithm of this embodiment is an algorithm to print an actual image based on input image data to compare reading image data obtained by reading the actual image with the input image data to thereby extract a singular portion, such as a white stripe. This embodiment is not limited to an inkjet printing apparatus as the complex machine 6. The following description will be made, however, based on an assumption that an image printed by the printing head 100 of the complex machine 6 is read by the reading head 107 of the same complex machine. First, the following section will describe the stochastic resonance processing used in this embodiment.

Reference is made again to FIG. 2 illustrating the concept of the processing using the stochastic resonance phenomenon also disclosed in the Collins et al. publication. A processing target signal I(x) is a value obtained from image data read by a reading sensor 109. The reference numeral x shows the pixel position. The processing target signal I(x) is branched to M pieces and each of the pieces is processed parallelly as follows. Each of the pieces is added with different noise N(x,m)×K, where m is a parameter showing one of M branch paths and is an integer in the range from 1 to M. N(x,m) shows a random number corresponding to the branch path m of the pixel position x and has the range from 0 to 1. The value N(x,m)×K, obtained by multiplying the random number N(x,m) by the noise strength K as an integer, is added to the processing target signal I(x). That is, assuming that the signal value after the addition of noise is i(x,m), then the following formula can be obtained:

$$i(x,m)=I(x)+N(x,m)\times K \quad \text{(Formula 1)}.$$

By comparing the signal value i(x,m), after the noise addition, with a predetermined threshold value T, nonlinear processing (binary processing) is performed to thereby obtain a binary signal j (x,m). Specifically, the following formula is established:

$$i(x,m) \geq T \rightarrow j(x,m)=1$$

$$i(x,m) \geq T \rightarrow j(x,m)=0 \quad \text{(Formula 2)}.$$

Thereafter, M pieces of binary signals j(x,m) are synthesized and are subjected to an average processing. The resultant value is set as the signal value J after the stochastic resonance. Specifically, the following formula is established:

$$J(x) = \frac{1}{M}\sum_{m=1}^{M} j(x,m). \quad \text{(Formula 3)}$$

In this embodiment, in the processing of the Collins et al. publication, as described above, the noise strength K and the threshold value T are adjusted depending on original image data inputted to the printing head 100.

FIGS. 9A to 9C are diagrams to explain the concept of a method of setting the threshold value T and the noise strength K in a case in which the image data as shown in FIG. 8A is input. FIG. 9A illustrates a common threshold value T set for the gradation 1 to the gradation 4. In this case, in order to substantially equalize the probabilities at which the common threshold value T is exceeded in the respective gradations, the noise strengths K at the respective gradations must be adjusted. Specifically, such a noise strength K is set that allows a difference C between a value obtained by adding the noise strength K to the brightness signal value S and the threshold value T has the same value at the respective gradations. That is, assuming that the gradation 1 has a noise strength K1, the gradation 2 has a noise strength K2, the gradation 3 has a noise strength K3, and the gradation 4 has a noise strength K4, then the following relationships are established under conditions in which C and T are a constant:

$$T=(S1+K1)+C,$$

$$T=(S2+K2)+C,$$

$$T=(S3+K3)+C, \text{ and}$$

$$T=(S4+K4)+C.$$

That is, since S1<S2<S3<S4 is established, K1>K2>K3>K4 is established.

FIG. 9B illustrates a case in which the common noise strength K is set at the gradation 1 to gradation 4. In order to substantially equalize the probabilities at which the threshold value is exceeded at the respective gradations, the threshold value T at the respective gradation must be adjusted. Specifically, assuming that the gradation 1 has a threshold value T1, the gradation 2 has a threshold value T2, the gradation 3 has a threshold value T3, and the gradation 4 has a threshold value T4, then the following relationship are established under condition in which C and K are a constant:

$$T=(S1+K)+C,$$

$$T=(S2+K)+C,$$

$$T=(S3+K)+C, \text{ and}$$

$$T=(S4+K)+C.$$

That is, since S1<S2<S3<S4 is established, T1<T2<T3<T4 is established.

FIG. 9C shows a case in which the gradation 1 to gradation 4 have threshold values T and noise strengths K different from one another. For example, even when similar defective ejections exist, a white stripe is less conspicuous in a region having a low gradation (or a high lightness) than in a region having a high gradation (or a low lightness), thus reducing the need to extract the white stripe as a singular portion. In such a case, instead of equalizing the probabilities at which the threshold value is exceeded as in FIGS. 9A and 9B, the probabilities are desirably adjusted depending on the gradations. In this case, the difference C between a value obtained by adding the noise strength K to the signal value S and the threshold value T is a value singular to each gradation, as follows:

$$T=(S1+K1)+C1,$$

$$T=(S2+K2)+C2,$$

$$T=(S3+K3)+C3, \text{ and}$$

$$T=(S4+K4)+C4.$$

Figure 10:
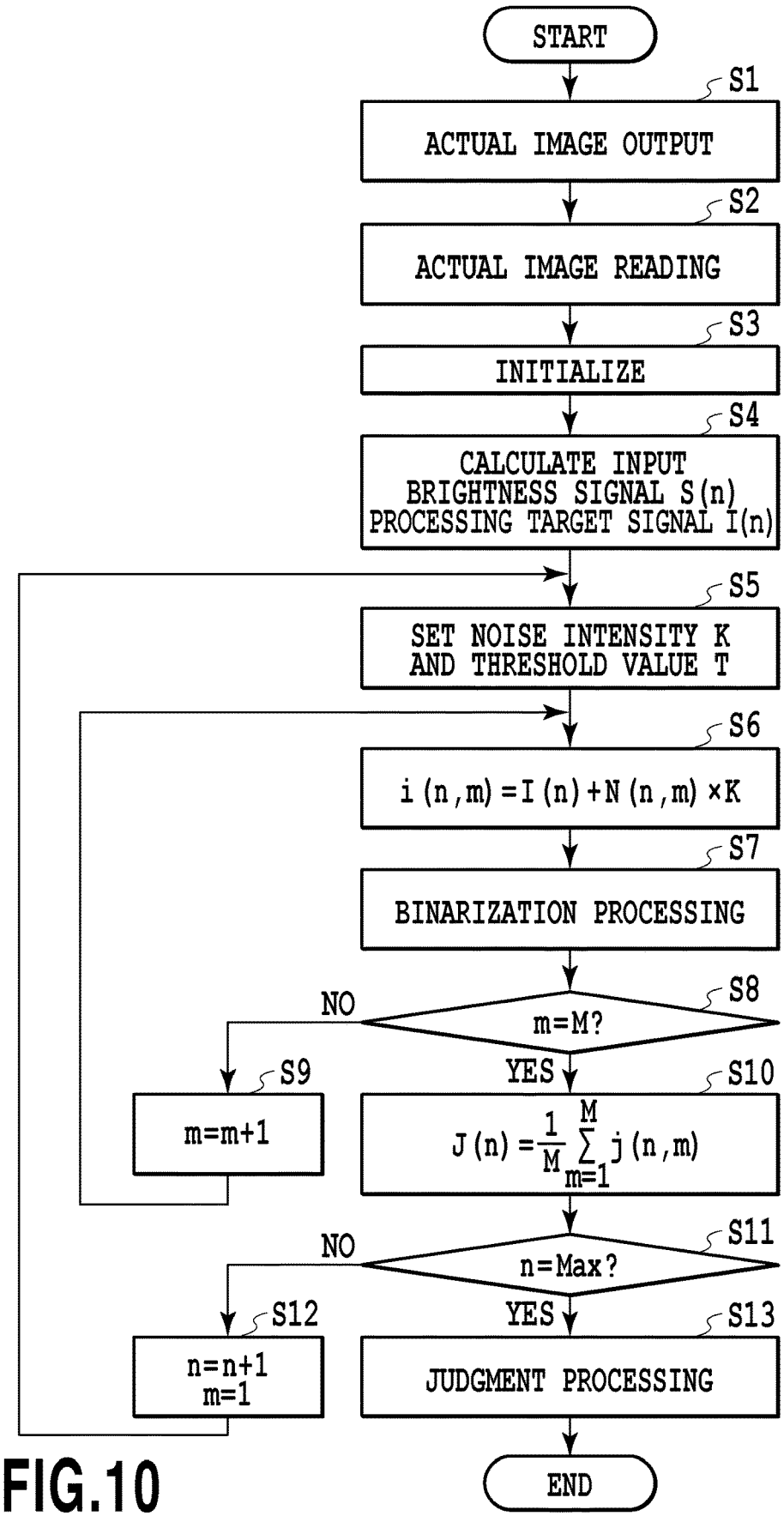
FIG. 10 is a flowchart illustrating a singular portion detection algorithm in the first embodiment.

FIG. 10 is a flowchart to explain the singular portion detection algorithm executed by the CPU 301 of this embodiment. When this processing is started, then the CPU 301 in step S1 allows the printing unit 5 to print an actual image. Specifically, the CPU 301 accesses the CPU 311 of the complex machine 6 to cause it to supply the sheet P into the apparatus. Then, based on received input image data, the printing head 100 is caused to print the actual image via the head controller 314.

Next, in step S2, the actual image printed in step S1 is read by the reading unit 2. Specifically, the scanner controller 307 is driven to obtain output signals from a plurality of reading elements arranged in the reading sensor 109 to acquire reading image data corresponding to pixel positions (x). The input image data received in step S1 and the reading image data acquired in step S2 are both multivalued RGB data. The CPU 301 stores these pieces of data in the RAM 312 by as pixel signals corresponding to the pixel positions (x).

Figure 1:
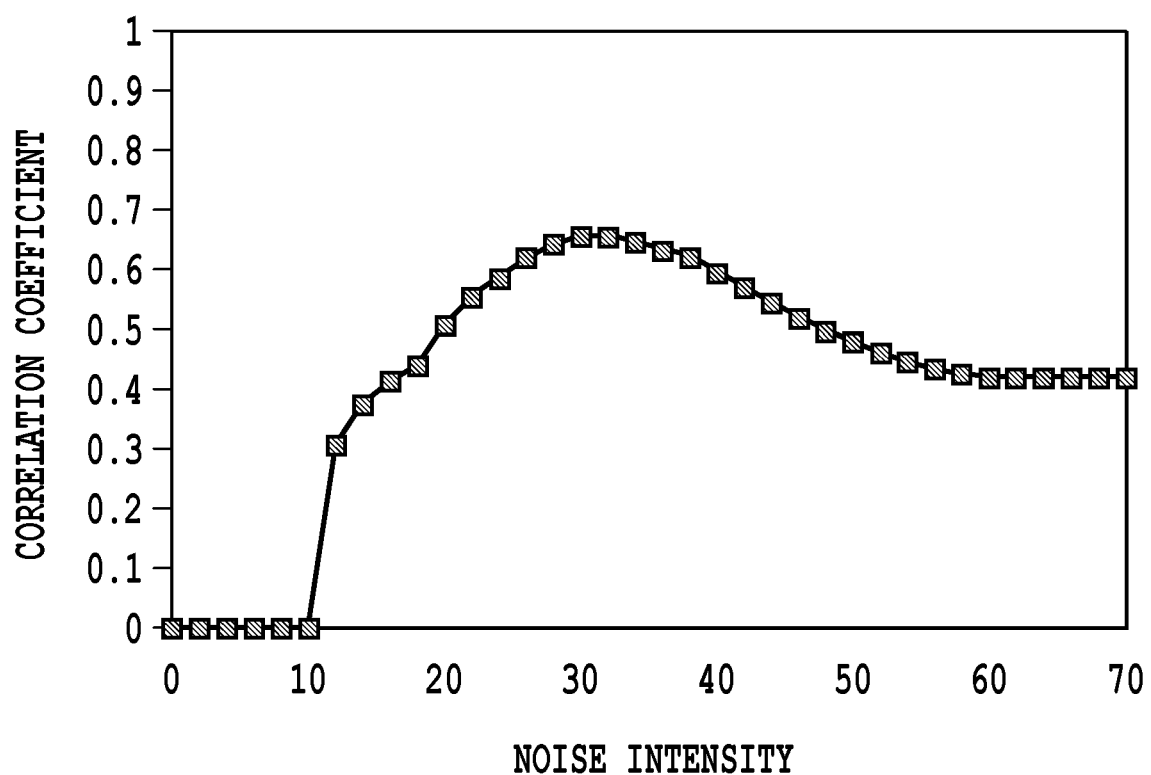
FIG. 1 illustrates a relationship between an added noise strength and a correlation coefficient in a stochastic resonance processing.
Figure 2:
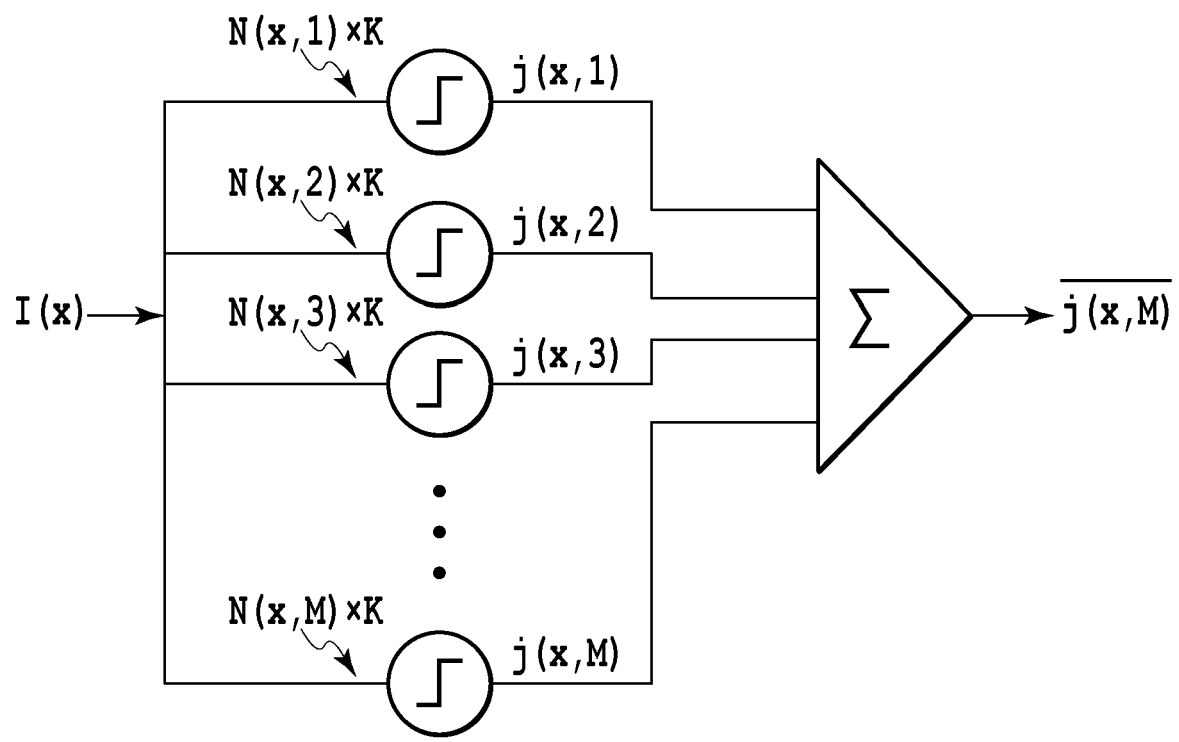
FIG. 2 illustrates the stochastic resonance processing in the Collins et al. publication.

In step S3, the CPU 301 initializes the parameters n and m (x=1, m=1), where n shows a processing target pixel, while m shows one of M branch paths arranged in FIG. 2.

In step S4, the CPU 301 calculates, based on the input image data received in step S1 and the reading image data acquired in step S2, the brightness signal value of the pixel (x) as a processing target by using formula 4. Hereafter, the brightness signal corresponding to the pixel (x) of the input image data is represented as an input brightness signal value S(x), while the brightness signal corresponding to the pixel (x) of the reading image data is represented as a processing target signal value I(x):

$$S(x)=Ri(x)\times 0.3+Gi(x)\times 0.6+Bi(x)\times 0.1, \text{ and}$$

$$I(x)=Rr(x)\times 0.3+Gr(x)\times 0.6+Br(x)\times 0.1 \quad \text{(Formula 4)}.$$

In the formulae listed above, Ri(x), Gi(x), and Bi(x) show the RGB signal values of the input image data corresponding to the pixel (x), respectively, and Rr(x), Gr(x), and Br(x)

show the RGB signal values of the reading image data, respectively. If these pieces of RGB data have a bit number of 8 bits, then S(x) and I(x) are in the range from 0 to 255, and, if these pieces of RGB data have a bit number of 16 bits, then S(x) and I(x) are in the range from 0 to 65535. In this embodiment, an example will be described in which these pieces of RGB data are 8 bits (0 to 255). The weighting coefficient (0.3, 0.6, 0.1) multiplied with the respective signal values RGB are an example, and can be appropriately adjusted depending on the feature of a to-be-extracted singular portion, an ink color to be used, or the color of the sheet, for example.

In step S5, the CPU 301 sets, based on the input brightness signal value I(x), the threshold value T and the noise strength K for using in the stochastic resonance processing. The threshold value T and the noise strength K can be set based on various concepts as described for FIGS. 9A to 9C. The setting method may be the one to refer a table stored in a memory for example in which the threshold value T and the noise strength K to be set are associated with the value of the input brightness signal S(x) or the one to calculate the values by using some formula. The table or formula may be prepared for each concept as described for FIGS. 9A to 9C.

In step S6, the CPU 301 calculates the signal value i(x,m) after the noise addition based on the formula 1. Specifically, a random number N(x,m) singular to (x,m) is generated and is multiplied with the noise strength K set in step S5. Then, the resultant value is added to the processing target signal I(x) obtained in step S4:

$$i(x,m)=I(x)+N(x,m)\times K \quad \text{(Formula 1).}$$

In this embodiment, the random number N(x,m) show white noise substantially uniformly generated in the range from 0 to 1.

In step S7, the CPU 301 compares the threshold value T set in step S5 with the signal value i(x,m) calculated in step S6 to perform the binary processing based on the formula 2, resulting in the binary data j(x,m) having a value of 1 or 0.

Next, in step S8, the CPU 301 determines whether or not m=is established. In a case in which m<M is established, the parameter m is incremented in step S9 and the processing returns to step S6 to process a branch path not yet subjected to the stochastic resonance processing. In a case in which m=is established on the other hand, this means that j(x,m) is obtained for all M branch paths. Thus, the processing proceeds to step S10 to acquire the signal value J(x) after the stochastic resonance based on the formula 3.

Next, in step S11, whether or not the parameter n reaches a maximum value. In a case in which n does not reach the maximum value, then in step S12 the CPU 301 increments the parameter n and returns the parameter m to the initial value. Then, the CPU 301 returns to step S4 in order to subject the next pixel (x) to the stochastic resonance processing. On the other hand, in a case in which the CPU 301 determines that the parameter n reaches the maximum value that is the CPU 301 determines that all pixels are completely subjected to the stochastic resonance processing, in step S11, then the CPU 301 proceeds to step S13.

In step S13, the CPU 301 performs the judgment processing based on the stochastic resonance data J(x) obtained in step S10 to extract singular portions. The judgment processing performed in step S13 is not limited to a particular method. For example, the stochastic resonance data J(x) may be compared with the judgment threshold value D prepared in advance to extract J(x) exceeding the judgment threshold value D as a singular portion. Alternatively, an average value of J(x) may be calculated for all pixels to extract portions having a value of J(x) that is excessively greater than this average value as singular portions. Then, this processing is completed. The display apparatus connected via the display I/F 306 may display pixels having a value equal to or greater than a predetermined threshold value so that the pixels can be observed by the inspector or also may directly display the stochastic resonance data J(x). Then, this processing is completed.

According to the above-described embodiment, the noise strength K and the threshold value T used for the stochastic resonance processing are set for each pixel based on input image data of a pixel as a processing target. This can consequently allow singular portions to be stably extracted from an actual image including various gradations.

Second Embodiment

The second embodiment is similar to the first embodiment in that the image processing systems described for FIG. 4 to FIG. 6B are used. In a case in which the printing head, as shown in FIG. 6A, is used in which many printing elements are arranged with a high density, even when there are relatively greater number of printing elements having defective ejections, a stripe in an actual image is not so conspicuous and thus, the stripe may not be recognized as a defect. Specifically, the conspicuousness of the white stripe depends on the density (gradation) of the actual image, the number, and the distribution of printing elements having defective ejections, in a printing element column. For example, even in the case of the same printing element column, a white stripe is less conspicuous in an image printed using a region including many printing elements having defective ejections (high density) than in an image printed using a region including a very few printing elements having defective ejections (low density), thus causing a case in which the need to extract a singular portion is eliminated. On the other hand, the number and positions of the printing elements having defective ejections in a printing element column also can be detected in advance. As can be seen from the description provided above, in this embodiment, the noise strength K and the threshold value T used for the stochastic resonance processing to extract singular portions in an actual image are set depending on the brightness signal S(x) of the input image data and the ejection status of a region including pixels as a processing target. Methods to detect the ejection status include, for example, the one to confirm an image obtained by printing a predetermined pattern or the one to confirm the ejection operation status by a sensor.

FIGS. 11A to 11D illustrate an example of image data to be printed by a printing element column and image data read by the reading head 107 as in FIGS. 8A to 8D. It is assumed that S1<S2 is established when the brightness signal value at the gradation 1 is S1 and the brightness signal value at the gradation 2 is S2. The gradation 1 and the gradation 2 include a region including relatively few defective ejections and a region including a relatively greater number of defective ejections, respectively. In the drawings, a region in the gradation 1 having a relatively few defective ejections is a region 1-1, a region in the gradation 1 having a relatively greater number of defective ejections is a region 1-2, a region in the gradation 2 having relatively few defective ejections is a region 2-1, and a region in the gradation 2 having a relatively greater number of defective ejections is a region 2-2. In view of the situation as described above, in this embodiment, the noise strength K and the threshold value T used in the stochastic resonance processing are set based on the brightness signal S(x) and the ejection status of a printing element region including a pixel as a processing target.

Figure 11A:
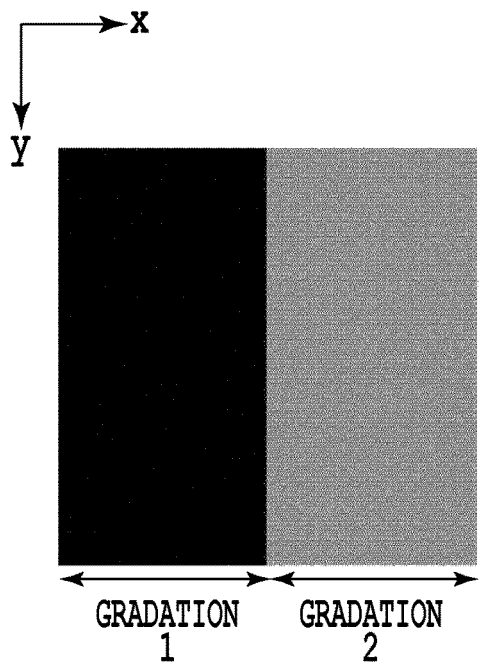
FIGS. 11A to 11D illustrate the input image data and the reading image data.
Figure 11B:
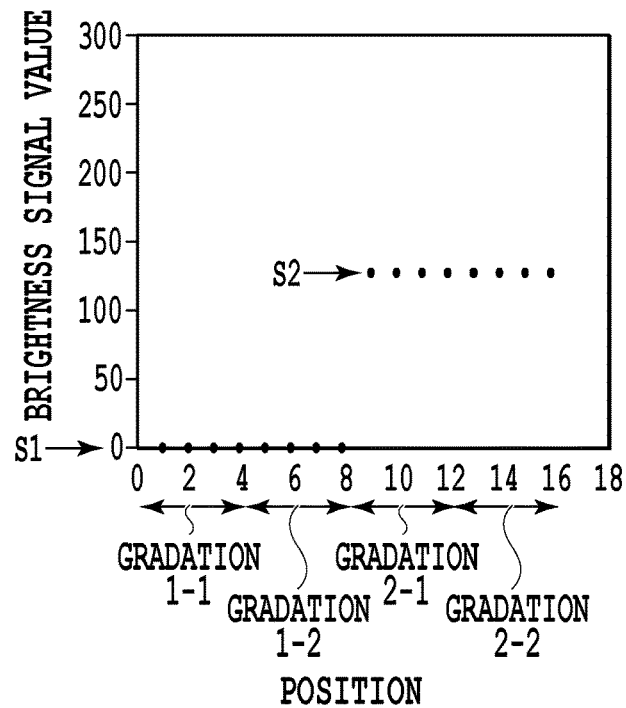
Figure 11C:
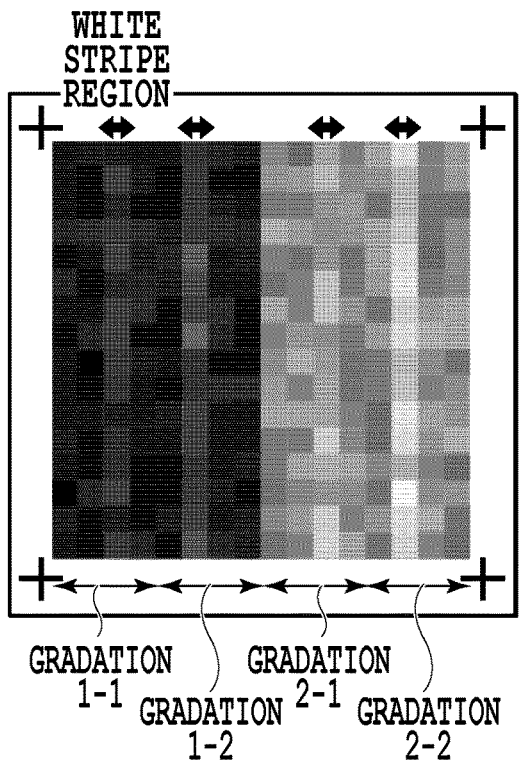
Figure 11D:
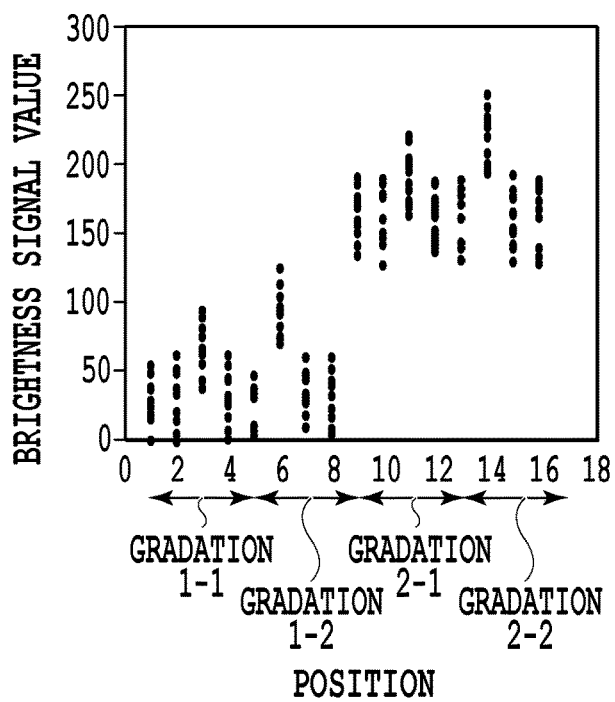
Figure 12B:
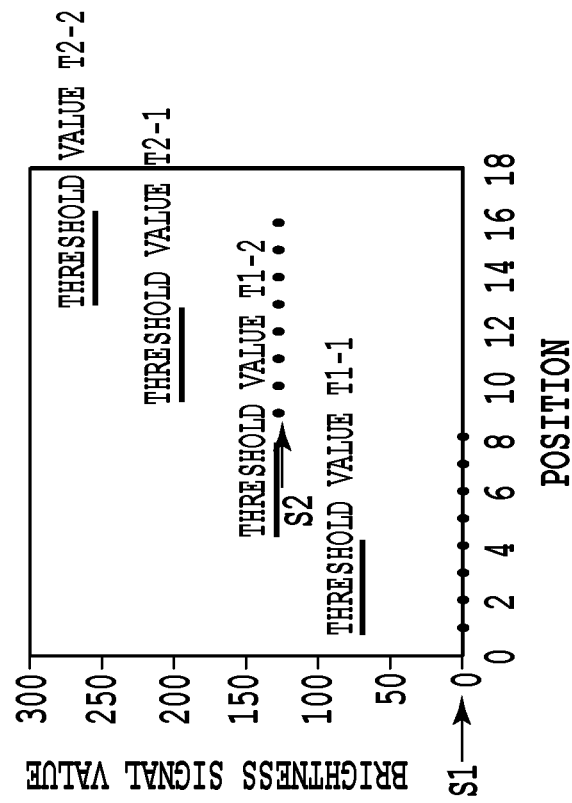
FIGS. 12A and 12B are diagrams to explain a method of setting a threshold value and the brightness signal value strength.
Figure 12A:
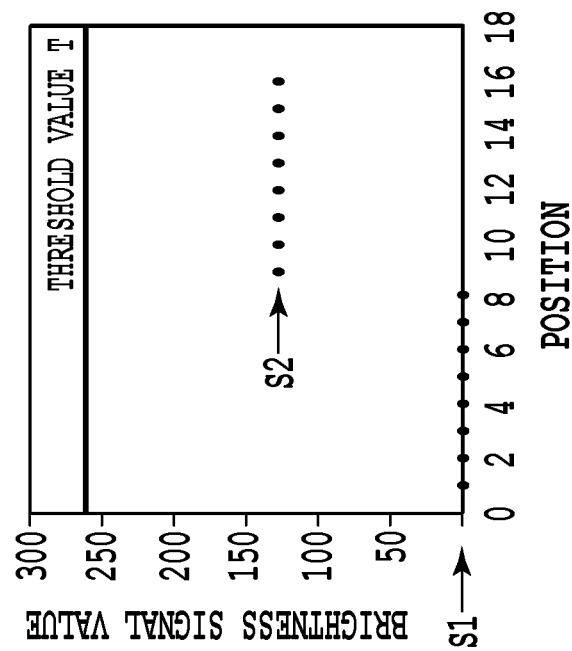

FIGS. 12A and 12B are diagrams to explain the concept of the method of setting the threshold value T and the noise strength K in a similar manner as in FIGS. 9A to 9C. FIG. 12A shows a case in which the common threshold value T is set for all regions. In this case, because the processing target signal values based on the reading image data are dispersed as shown in FIG. 11D, in order to substantially equalize the probabilities in which the threshold value is exceeded in the respective regions, there is need to adjust the noise strength K for the respective gradations. For example, assuming that the region 1-1 has a noise strength K1-1, the region 1-2 has a noise strength K1-2, the region 2-1 has a noise strength K2-1, and the gradation 2-2 has a noise strength K2-2, then the following relationship is established: K1-1>K1-2>K2-1>K2-2.

FIG. 12B shows a case in which the common noise strength K is set for all regions. In order to substantially equalize the probabilities in which the threshold value is exceeded in all regions, there is need to adjust the threshold value T for the respective region. For example, assuming that the region 1-1 has a threshold value T1-1, the region 1-2 has a threshold value T1-2, the region 2-1 has a threshold value T2-1, and the region 2-2 has a threshold value T2-2, then the following relationship is established: T1-1<T1-2<T2-1<T2-2.

This embodiment is similar to the first embodiment in that the singular portion detection algorithm can be executed based on the flowchart described for FIG. 10. In step S5, however, the noise strength K and the threshold value T are set based on the brightness signal S(x) in a pixel of a processing target and a printing element characteristic corresponding to the pixel of the processing target. The setting method may be, as in the first embodiment, the one to refer a table stored in a memory, for example, in which the threshold value T and the noise strength K to be set are associated with the value of the brightness signal and the printing element characteristic, or the one to calculate the values by using some formula.

In the above description, a configuration has been provided in which, since an inkjet printing apparatus is used, the ejection status of an individual printing element is detected in advance. Even when an image is printed by other methods, however, such as a heat transfer method, the effect of this embodiment can be obtained so long as the printing status of the individual printing element is acquired in advance.

Third Embodiment

According to the Collins et al. publication, the greater value M is preferred in the stochastic resonance processing described in the formula 1 to formula 3. An increase of the value M allows the signal value J(x) to be closer to a value showing the probability at which the processing target signal value I(x) of each pixel exceeds the binary threshold value T in the nonlinear processing. In other words, deriving a formula for calculating the probability at which the processing target signal value I(x) exceeds the binary threshold value T allows, without requiring as much noise addition processing or nonlinear processing as shown in FIG. 2, a detection processing equivalent thereto. In this embodiment, such a single formula is derived in advance to use this formula to realize an effect similar to that of the above embodiment. Thus, the following section will first describe the probability at which the processing target signal I(x) exceeds the binary threshold value T.

Figure 13A:
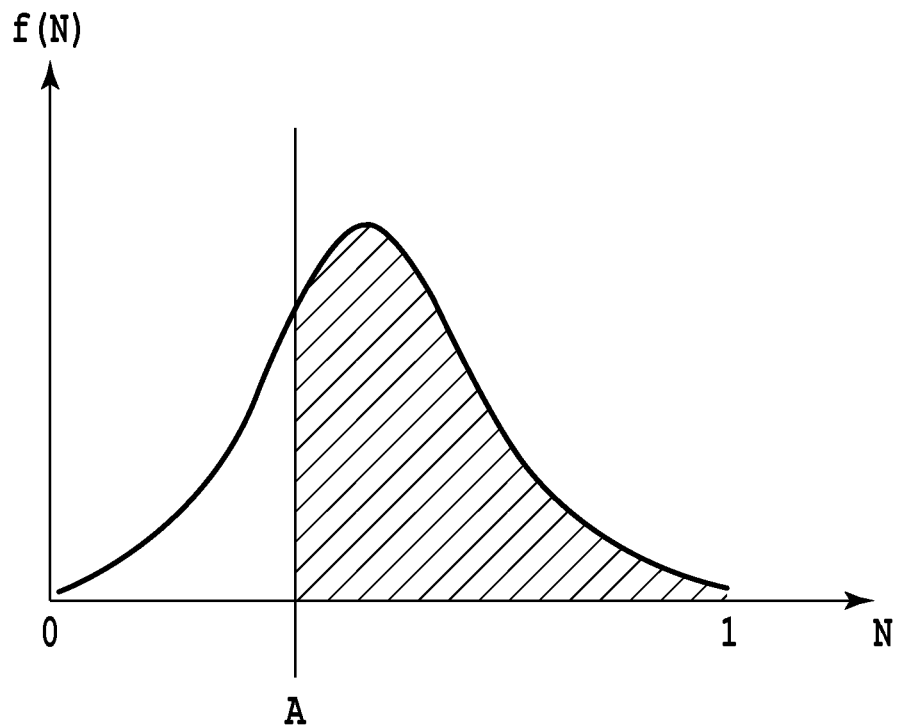
FIGS. 13A and 13B illustrate the histogram of the random number N.
Figure 13B:
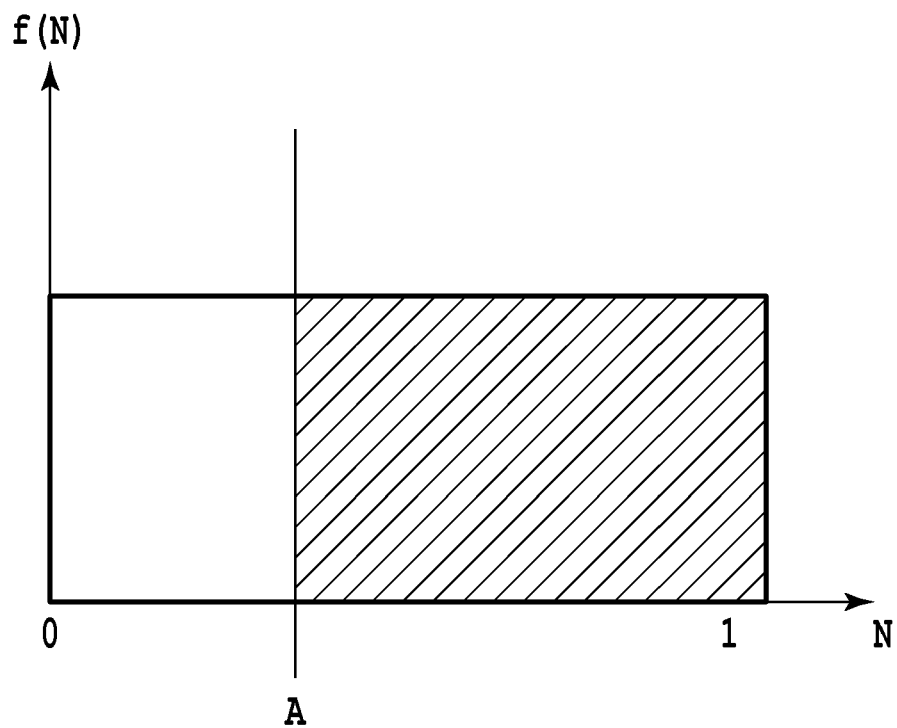

FIGS. 13A and 13B illustrate a histogram that is convergent in a case an infinite number of random numbers N are generated. The horizontal axis shows the random number N in the range from 0 to 1. The vertical axis shows the probability f(N) at which each value N occurs. FIG. 13A illustrates a case in which the average value is 0.5 and the normal distribution based on $3\sigma=1$ is used and FIG. 13B illustrates a case in which the random number N in the range of 0 to 1 is generated at the same frequency (so-called white noise). The following description will be made based on the assumption that the random number N is generated based on such a distribution.

According to the formula 1 and formula 2, the probability at which the result after the binarization of the individual pixel is j(x,m)=1 is equal to the probability at which $I(x)+N(x,m) \times K \geq T$ is established.

Assuming that K(strength) has a positive value, then the above formula can be expressed as follows:

$$N(x,m) \geq \{T - I(x)\}/K \quad \text{(Formula 5)}.$$

Assuming that the right side is A, then the following formula can be established:

$$N(x,m) \geq A \quad \text{(Formula 6)}.$$

The probability at which the result j(x,m) of the individual pixel after the binarization is j(x,m)=1, that is, the signal value J(x) after the stochastic resonance processing, is a probability that the formula 6 is satisfied. In the respective diagrams of FIGS. 13A and 13B, the areas of the shaded areas correspond to this probability and can be represented by the following formula:

$$J(x) = \begin{cases} 1 & A < 0 \\ 0 & A > 1 \\ 1 - \int_{N=0}^{A} f(N)dN & 0 \leq A \leq 1 \end{cases} \quad \text{(Formula 7)}$$

In the case in which the histogram for the generation of the random number N has a normal distribution as shown in FIG. 13A, then the formula 7 is represented as shown below:

$$J(x) = \begin{cases} 1 & A < 0 \\ 0 & A > 1 \\ 1 - \exp\{-\alpha(A - 0.5)\} & 0 \leq A \leq 1 \end{cases}.$$

In a case in which the histogram for the noise N has the normal distribution of $\pm 3\sigma=1$ as shown in FIG. 13A, then the coefficient $\alpha$ is about $\alpha=10.8$. When the constant A is returned to the original formula $\{T-I(x,m)\}/K$, then the formula 8 is represented as shown below:

$$J(x) = \begin{cases} 1 & T < I(x) \\ 0 & I(x) < T - K \\ 1 - \dfrac{1}{1 + \exp\left\{-\alpha\left(\dfrac{(T-I(x))}{K} - 0.5\right)\right\}} & T - K \leq I(x) \leq T \end{cases} \quad \text{(Formula 8)}$$

In a case in which the histogram for the generation of the random number N is as shown in FIG. 13B, on the other hand, then the formula 7 can be represented as shown below:

$$J(x) = \begin{cases} 1 & A < 0 \\ 0 & A > 1 \\ 1-A & 0 \leq A \leq 1 \end{cases}$$

When the constant A is returned to the original formula {T−I(x)}/K, the formula is represented by formula 9, as below:

$$J(x) = \begin{cases} 1 & T < I(x) \\ 0 & I(x) < T - K \\ 1-(T-I(x))/K & T-K \leq I(x) \leq T \end{cases} \quad \text{(Formula 9)}$$

Figure 14A:
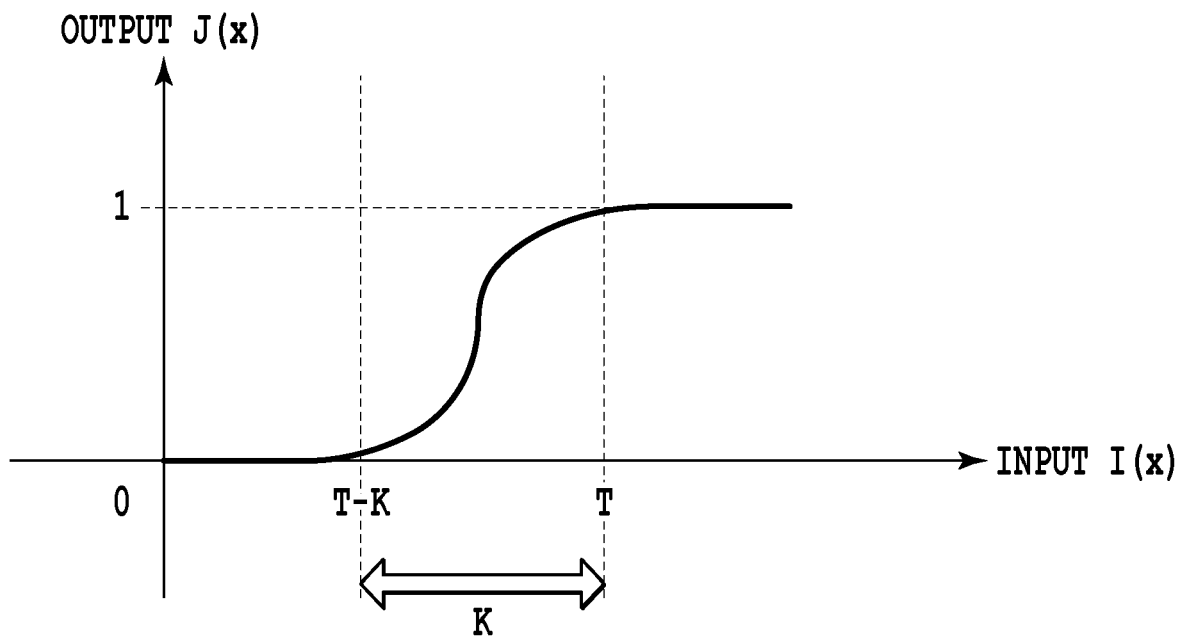
FIGS. 14A and 14B illustrate a formula 8 and a formula 9 by graphs.
Figure 14B:
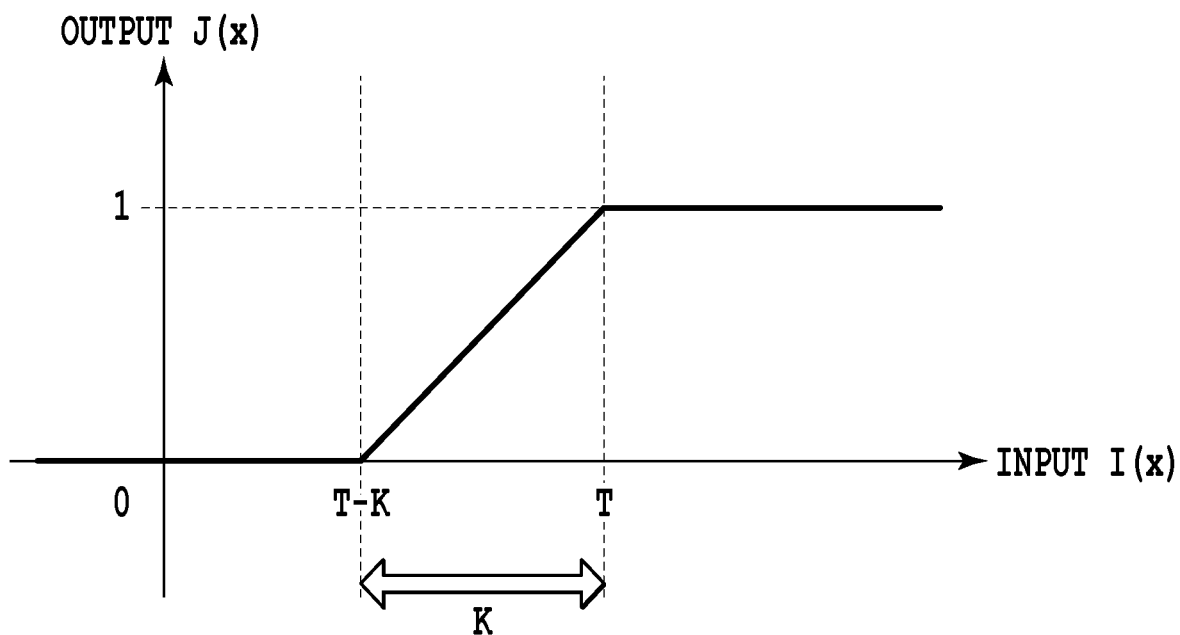

FIGS. 14A and 14B illustrate the formula 8 and formula 9 by graphs. By using the formula 8 or formula 9 under an appropriate noise strength K and a threshold value T, a singular portion can be extracted at such an accuracy that is the same as an accuracy at which the method of the Collins et al. publication is used to set a branch number M to the detection target signal value I(x) at infinity.

In this embodiment, while using the image processing system described for FIG. 4 to FIG. 6B, as in the first embodiment, any of the formula 8 or formula 9 is used instead of the M parallel column processing described in the first embodiment as a singular portion detection algorithm.

Figure 15:
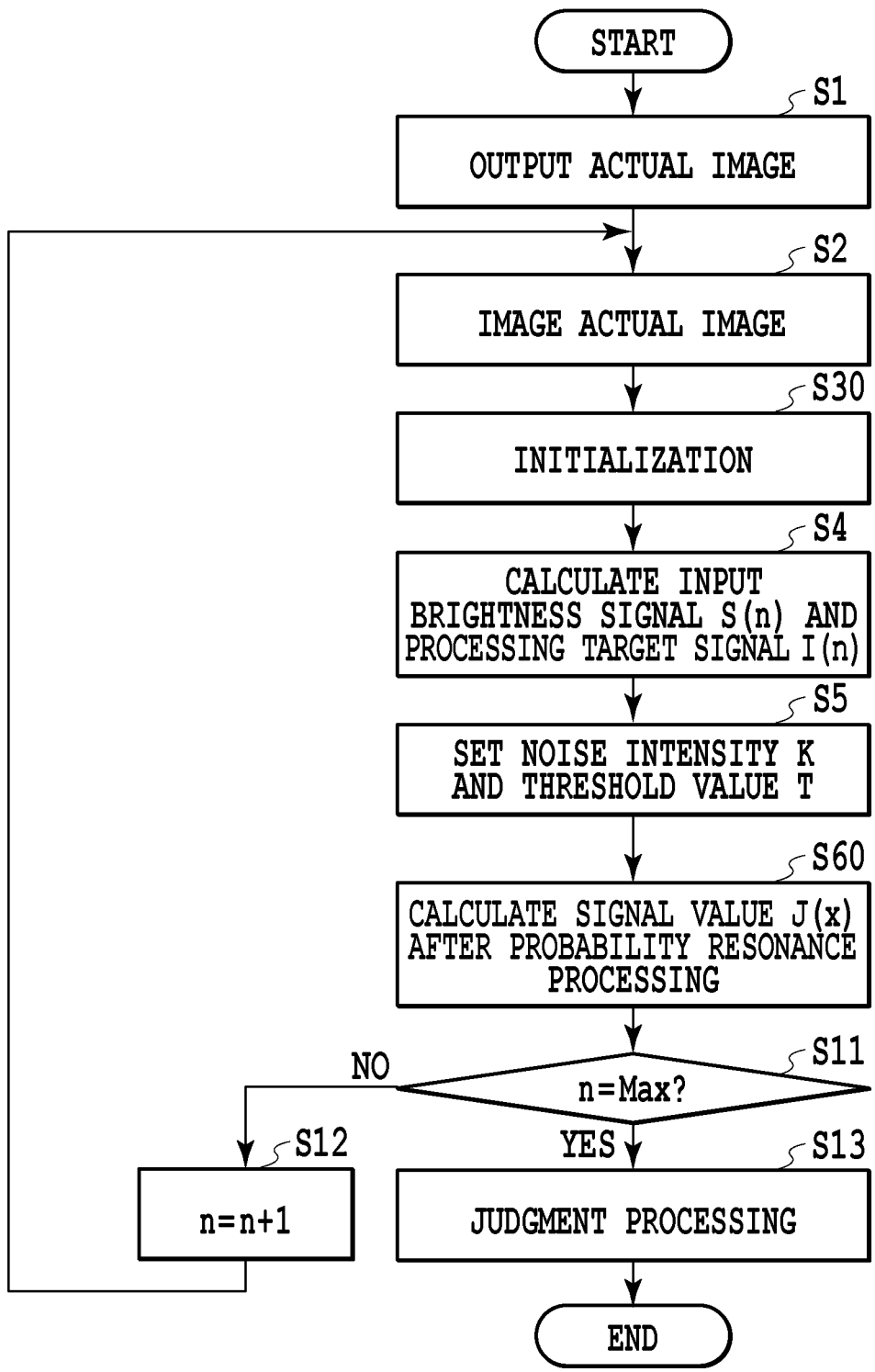
FIG. 15 is a flowchart illustrating a singular portion detection algorithm in a third embodiment.

FIG. 15 is a flowchart for explaining the singular portion detection algorithm executed by the CPU 301 of this embodiment. The following section will only describe steps different from those of the flowchart of FIG. 10 described in the first embodiment.

In step S30, the CPU 301 initializes the parameter x (x=1). In step S60, the CPU 301 substitutes the inspection target signal value I(x) calculated in step S4 into I(x) of the formula 8 or formula 9 and uses the noise strength K and the threshold value T set in step S5 to calculate the signal value J(x) after the stochastic resonance processing. Thereafter, the processing after step S11 may be performed as in the first embodiment.

The embodiment described above allows, without requiring many nonlinear circuits, a singular portion to be stably extracted from an actual image including various gradations.

Other Embodiments

The above description has been made for an example in which the full line-type inkjet printing apparatus shown in FIG. 5 is used as the complex machine 6. The present invention is not limited, however, to such an embodiment. A printing unit using the serial type inkjet printing apparatus as shown in FIGS. 16A and 16B also can be used.

Figure 16A:
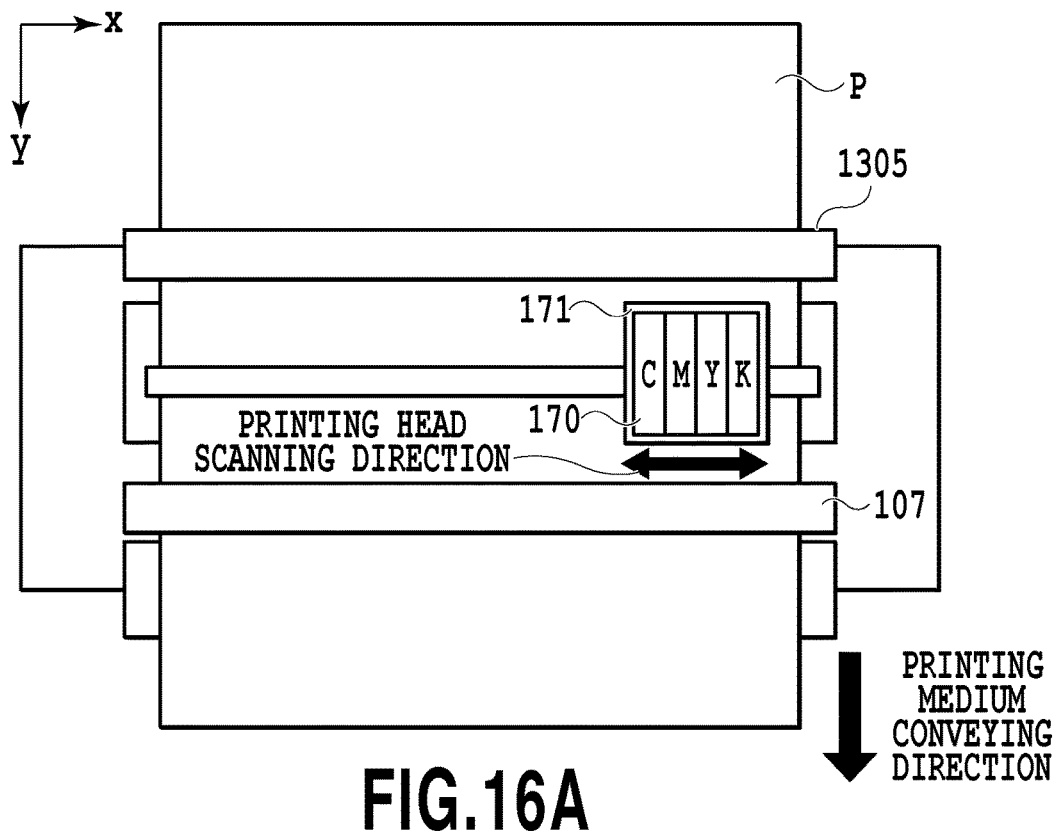
FIGS. 16A and 16B illustrate a serial-type inkjet printing apparatus.

In FIG. 16A, the printing head 170 is reciprocated in the X direction in the drawing while being provided on a carriage 171. During this travel, four printing element columns eject inks of black (K), cyan (c), magenta (M), and yellow (Y), respectively. When such printing scanning is completed, the sheet P is conveyed in the Y direction by a distance corresponding to the printing width of the printing head 170. By alternately repeating the printing scanning and the conveying operation as described above, an image is formed on the sheet P. On the other hand, the reading head 107 is composed of a plurality of reading elements arranged in the X direction, as in FIG. 5.

Figure 16B:
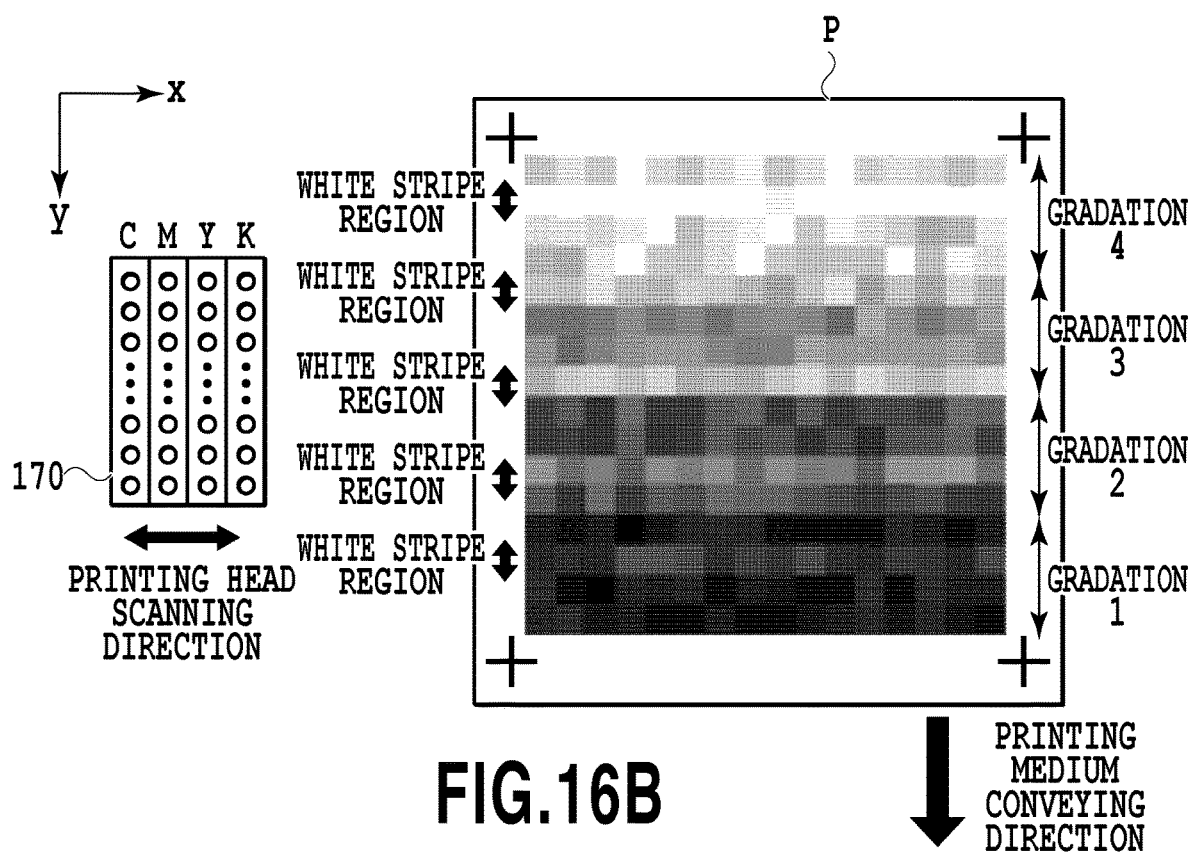

In a case in which the serial type inkjet printing apparatus, as in FIG. 16A, includes a printing element having a defective ejection, a white stripe extends in the X direction as shown in FIG. 16B. Another white stripe caused by the conveying operation also extends in the X direction. That is, in the case of the serial-type printing apparatus, a stripe caused by a printing element having a defective ejection and a stripe caused by an error in the conveying operation similarly appear in the same direction. Even in such a case, a singular portion can be stably extracted from an actual image by using appropriate threshold value and noise strength depending on the input image data to perform the stochastic resonance processing described above.

Although the above description has been made based on an example in which a white stripe is caused by a defective ejection, the embodiment described above also can be used to extract singular portions having a brightness value that is less than those of the surrounding points, such as a black stripe or density unevenness caused by excessive ejection. Even in such a case, an effect similar to that of the embodiment can be obtained by setting an appropriate threshold value T and a noise strength K depending on the input image data to use the threshold value T and the noise strength K to perform the stochastic resonance processing.

In the above description, in view of the fact that the conspicuous defect of a white stripe depends on the gradation (gray density), the RGB signals of the image data are substituted in (formula 4) and the threshold value T and the noise strength K are set based on the calculated brightness signal S. The present invention is not limited, however, to such an embodiment. The brightness signal S(x) and processing target signal I(x) used in the above embodiment also can be calculated not only based on the linear function as in the formula 4, but also based on other functions, such as a multidimensional function.

In the above description, in step S4, the RGB signals of reading image data are substituted in the formula 4 to thereby calculate the processing target signal I(n). The processing target signal I(n) in the stochastic resonance processing after step S6 also can be set, however, as a difference between the reading image data and the input image data. In this case, the processing target signal I(n) can be calculated by the following formula:

$$I(n) = I(x) - (Rr(x) - Ri(x)) \times 0.3 + (Gr(x) - Gi(x)) \times 0.6 + (Br(x) - Bi(x)) \times 0.1.$$

Furthermore, a system has been illustratively described in which the complex machine 6 is connected to the image processing apparatus 1 as shown in FIG. 4. The present invention is not limited, however, to such an embodiment.

Embodiments of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or the apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
   (A) a memory that stores instructions; and
   (B) one or more processors that execute the instructions stored in the memory to function as:
      (a) a receiving unit configured to receive input image data having a plurality of input signal values of an image;
      (b) an acquisition unit configured to acquire read image data having a plurality of pixel signals corresponding to respective pixels of a read image, which is obtained by reading an image printed on a printing medium by a printing unit based on the input image data received by the receiving unit;
      (c) a stochastic resonance processing unit configured to execute stochastic resonance processing to obtain a result corresponding to a result that is calculated in a case in which each of a plurality of read brightness signal values, included in respective pixel signals of the plurality of pixel signals of the image data read by the acquisition unit, is added to noise in a noise addition processing, and is subjected to a binary processing, and a plurality of results, obtained by performing the noise addition processing and the binary processing on the plurality of read brightness signal values in parallel, are synthesized, wherein the stochastic resonance processing unit sets, with regard to a read brightness signal value as a processing target pixel, at least one of a strength of the noise and a threshold value used for the binary processing according to an input brightness signal value, of a plurality of input brightness signal values corresponding to the input signal values, respectively, received by the receiving unit, for a pixel corresponding to the processing target pixel of the input image data; and
      (d) an output unit configured to output the result of the stochastic resonance processing.

2. The image processing apparatus according to claim 1, wherein the stochastic resonance processing unit calculates a difference between the read brightness signal value of the read image data and the input brightness signal value of the input image data, adds the noise to the difference in the noise addition processing, and subjects the difference to the binary processing.

3. The image processing apparatus according to claim 1, wherein each brightness signal value, of the plurality of input brightness signal values of the input image data, has red (R), green (G), and blue (B) brightness signals, and the stochastic resonance processing unit sets at least one of the strength of the noise and the threshold value used in the binary processing based on a brightness signal obtained by synthesizing the R, G, and B brightness signals.

4. The image processing apparatus according to claim 1, wherein each read brightness signal value, of the plurality of read brightness signal values of the read image data, has red (R), green (G), and blue (B) brightness signals, and the stochastic resonance processing unit performs the stochastic resonance processing on a brightness signal obtained by synthesizing the R, G, and B brightness signals.

5. The image processing apparatus according to claim 1, wherein the printing unit prints the image using a plurality of printing elements, and the stochastic resonance processing unit sets at least one of the strength of the noise and the threshold value based on a pixel signals of the input image data and a printing status of a printing element, of the plurality of printing elements, corresponding to the pixel signal as the processing target.

6. The image processing apparatus according to claim 5, wherein the printing unit is an inkjet printing apparatus, and the one or more processors further function as (e) a detection unit configured to detect an ink ejection status of the printing element, of the plurality of printing elements, as the printing status.

7. The image processing apparatus according to claim 1, wherein the printing unit is an inkjet printing apparatus including a plurality of printing elements, and a singular portion is a white stripe caused by ejection failure of a printing element, of the plurality of printing elements.

8. The image processing apparatus according to claim 1, wherein the noise is white noise.

9. The image processing apparatus according to claim 1, wherein the stochastic resonance processing is performed by using the following formula to calculate data J(x) obtained by processing the read brightness signal value I(x), $$J(x) = \begin{cases} 1 & T < I(x) \\ 0 & I(x) < T - K \\ 1 - (T - I(x))/K & T - K \leq I(x) \leq T \end{cases}$$

where T is a threshold value to quantize the input data, and K is a noise strength.

10. The image processing apparatus according to claim 1, wherein the one or more processors further function as (e) an extraction unit configured to extract a singular portion based on the result of the stochastic resonance processing.

11. The image processing apparatus according to claim 1, wherein the one or more processors further function as (e) a reading unit configured to image the image printed by the printing unit.

12. The image processing apparatus according to claim 11, further comprising (C) the printing unit.

13. An image processing method comprising:
   a receiving step of receiving input image data having a plurality of input signal values of an image;
   a step of acquiring read image data having a plurality of pixel signals corresponding to respective pixels of a read image, which is obtained by reading an image printed on a printing medium by a printing unit based on the received input image data;

a stochastic resonance processing step of executing stochastic resonance processing to obtain a result corresponding to a result that is calculated in a case in which each of a plurality of brightness signal values, included in respective pixel signals of the plurality of pixel signals of the image data read in the acquiring step, is added to noise in a noise addition processing, and subjected to a binary processing and a plurality of results, obtained by performing the noise addition processing and the binary processing on the plurality of pixel signals in parallel, are synthesized, wherein, in the stochastic resonance processing step, with regard to a brightness signal value as a processing target pixel, at least one of a strength of the noise and a threshold value used for the binary processing is set according to an input brightness signal value, of a plurality of input brightness signal values corresponding to the input signal values, respectively, received by the receiving unit, for a pixel corresponding to the processing target pixel of the input image data; and an output step of outputting the result of the stochastic resonance processing.

14. The image processing method according to claim 13, wherein the stochastic resonance processing step calculates a difference between the read brightness signal value of the read image data and the input brightness signal value of the input image data, adds the noise to the difference in the noise addition processing, and subjects the difference to the binary processing.

15. The image processing method according to claim 13, wherein each brightness signal value, of the plurality of input brightness signal values of the input image data, has red (R), green (G), and blue (B) brightness signals, and, in the stochastic resonance processing step, at least one of the strength of the noise and the threshold value used in the binary processing is set based on a brightness signal obtained by synthesizing the R, G, and B brightness signals.

16. The image processing method according to claim 13, wherein each read brightness value, of the plurality of read brightness signal values of the read image data, has red (R), green (G), and blue (B) brightness signals, and, in the stochastic resonance processing step, the stochastic resonance processing is performed on a brightness signal obtained by synthesizing the R, G, and B brightness signals.

17. The image processing method according to claim 13, wherein the image is printed using a plurality of printing elements, and, in the stochastic resonance processing step, at least one of the strength of the noise and the threshold value is set based on a pixel signals of the input image data and a printing status of a printing element, of the plurality of printing elements, corresponding to a pixel signal as the processing target.

18. The image processing method according to claim 17, wherein the image is printed by an inkjet printing apparatus, and the image processing method further comprises a detecting step of detecting an ink ejection status of the printing element as the printing status.

19. The image processing method according to claim 13, wherein the image is printed by an inkjet printing apparatus including a plurality of printing elements, and a singular portion is a white stripe caused by an ejection failure of a printing element of the plurality of printing elements.

20. The image processing method according to claim 13, wherein the noise is white noise.

21. The image processing method according to claim 13, wherein the stochastic resonance processing is performed by using the following formula to calculate data J(x) obtained by processing the read brightness signal value I(x), $$J(x) = \begin{cases} 1 & T < I(x) \\ 0 & I(x) < T - K \\ 1 - (T - I(x))/K & T - K \leq I(x) \leq T \end{cases}$$

where T is a threshold value to quantize the input data, and K is a noise strength.

22. The image processing method according to claim 13, further comprising an extraction step of extracting a singular portion based on the result of the stochastic resonance processing.

23. The image processing method according to claim 13, further comprising a reading step of imaging the printed image.

24. The image processing method according to claim 23, further comprising a printing step of printing the image based on the input image data.

25. A non-transitory computer-readable storage medium that stores a program for allowing a computer to execute an image processing method, the image processing method comprising:

a receiving step of receiving input image data having a plurality of input signal values of an image;

a step of acquiring read image data having a plurality of pixel signals corresponding to respective pixels of a read image, which is obtained by reading an image printed on a printing medium by a printing unit based on the received input image data;

a stochastic resonance processing step of executing stochastic resonance processing to obtain a result corresponding to a result that is calculated in a case in which each of a plurality of brightness signal values, included in respective pixel signals of the plurality of pixel signals of the image data read in the acquiring step, is added to noise in a noise addition processing, and subjected to a binary processing, and a plurality of results, obtained by performing the noise addition processing and the binary processing on the plurality of pixel signals in parallel, are synthesized wherein, in the stochastic resonance processing step, with regard to a brightness signal value as a processing target pixel, at least one of a strength of the noise and a threshold value used for the binary processing is set according to an input brightness signal value, of a plurality of input brightness signal values corresponding to the input signal values, respectively, received by the receiving unit, for a pixel corresponding to the processing target pixel of the input image data; and an output step of outputting the result of the stochastic resonance processing.

26. The image processing apparatus according to claim 1, wherein, in a case in which the input brightness signal value is a first value, the strength of the noise is set to a first strength value, and, in a case in which the input brightness signal value is a second value that is greater than the first value, the threshold value is set to a second strength value that is less than the first strength value.

27. The image processing apparatus according to claim 1, wherein, in a case in which the input brightness signal value is a first value, the threshold value is set to a first threshold value, and, in a case in which the input brightness signal value is a second value that is greater than the first value, the threshold value is set to a second threshold value that is greater than the first threshold value.

28. The image processing apparatus according to claim 1, wherein a number of the plurality of results is one of an infinite number of random numbers.

29. The image processing method according to claim 13, wherein a number of the plurality of results is one of an infinite number of random numbers.

\* \* \* \* \*